(12) United States Patent
Yamamoto et al.

(10) Patent No.: US 7,075,521 B2
(45) Date of Patent: Jul. 11, 2006

(54) INPUT-OUTPUT INTEGRATED TYPE DISPLAY DEVICE

(75) Inventors: Tomohiko Yamamoto, Nara (JP); Koji Fujiwara, Tenri (JP); Keiichi Tanaka, Tenri (JP); Naoto Inoue, Shiki-gun (JP); Hideki Ichioka, Nabari (JP)

(73) Assignee: Sharp Kabushiki Kaisha, Osaka (JP)

( * ) Notice: Subject to any disclaimer, the term of this patent is extended or adjusted under 35 U.S.C. 154(b) by 230 days.

(21) Appl. No.: 10/238,896

(22) Filed: Sep. 11, 2002

(65) Prior Publication Data

US 2003/0048261 A1 Mar. 13, 2003

(30) Foreign Application Priority Data

Sep. 11, 2001 (JP) .............................. 2001-274945
Jan. 25, 2002 (JP) .............................. 2002-017151

(51) Int. Cl.
*G09G 5/00* (2006.01)

(52) U.S. Cl. ..................... 345/173; 345/38; 345/158; 345/174; 345/176

(58) Field of Classification Search .................. 345/38, 345/104, 173–174, 176, 158; 178/18, 19
See application file for complete search history.

(56) References Cited

U.S. PATENT DOCUMENTS 5,642,134 A 6/1997 Ikeda
5,854,881 A * 12/1998 Yoshida et al. ............. 345/104
5,856,639 A * 1/1999 Landmeier ................ 178/18.01
5,940,064 A * 8/1999 Kai et al. .................... 345/173
6,054,851 A * 4/2000 Masreliez et al. ...... 324/207.17
6,259,437 B1 * 7/2001 Onodaka et al. ............ 345/174
6,392,728 B1 * 5/2002 Tanaka et al. ............. 349/106
6,654,092 B1 * 11/2003 Yanagawa et al. .......... 349/141

FOREIGN PATENT DOCUMENTS

| JP | 6-250787 | 9/1994 |
|---|---|---|
| JP | 6-314165 | 11/1994 |
| JP | 8-146381 | 6/1996 |
| JP | 10-269020 | * 10/1998 |

* cited by examiner

*Primary Examiner*—Bipin Shalwala
*Assistant Examiner*—Leonid Shapiro
(74) *Attorney, Agent, or Firm*—Nixon & Vanderhye P.C.

(57) ABSTRACT

Input position is accurately detected. In an x-detection period of a non-display period, a source drive circuit simultaneously applies to all signal wiring lines a pulse of a peak value proportional to a distance from a gate drive circuit. A coordinate detection circuit obtains an x-coordinate on the basis of a voltage induced at a pen corresponding to the peak value (x-coordinate) of the applied pulse. In a y-detection period, a pulse generation circuit applies one pulse to a common line. The pen detects a potential variation in amplitude proportional to a distance (y-coordinate) from the source drive circuit, generated approximately simultaneously on all the signal wiring lines via a capacitance. The coordinate detection circuit obtains the y-coordinate similarly to the case of x-coordinate detection.

24 Claims, 16 Drawing Sheets

Fig.5
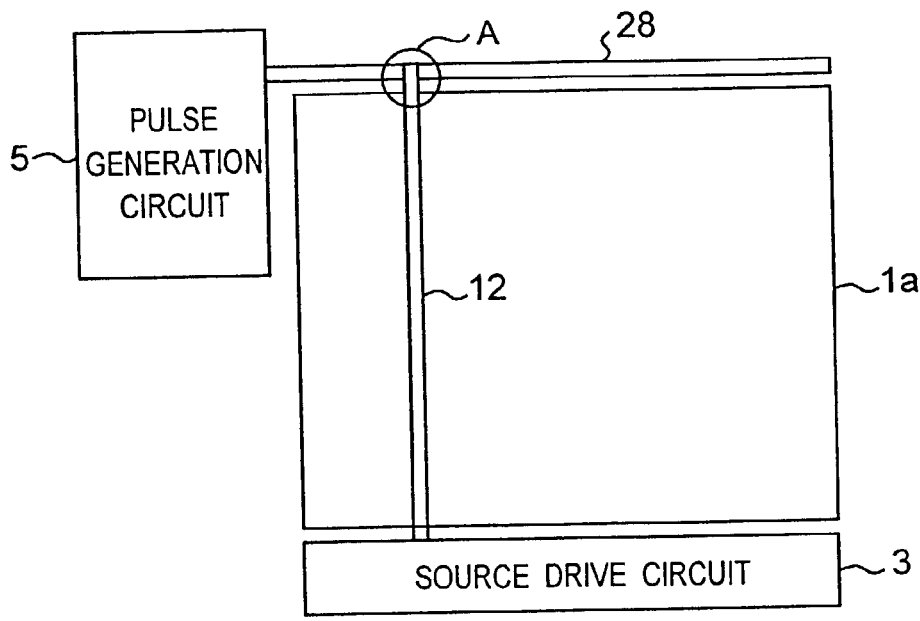
Fig.6
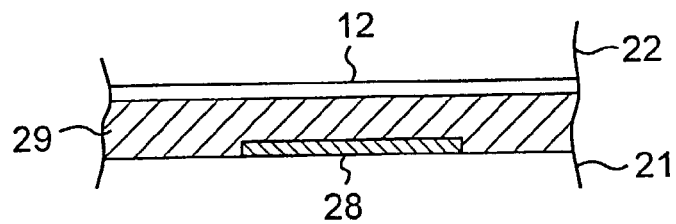
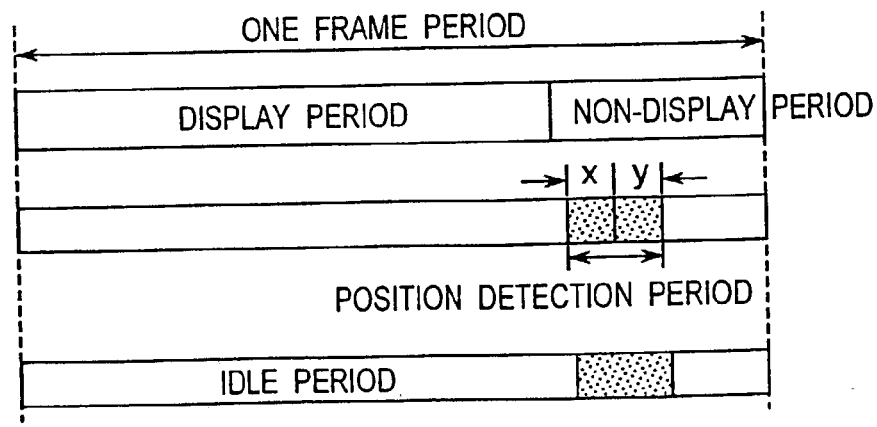
Fig.7A
Fig.7B
Fig.7C

Fig.11
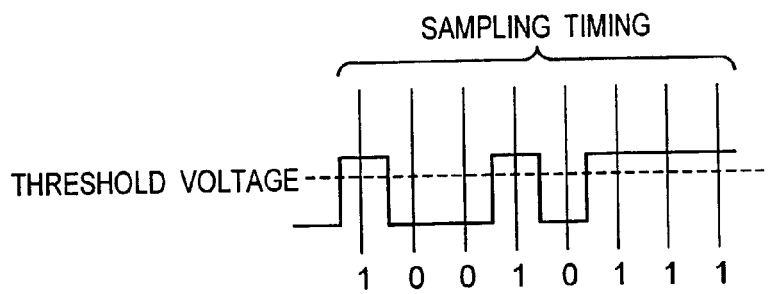
Fig.12A                    Fig.12B
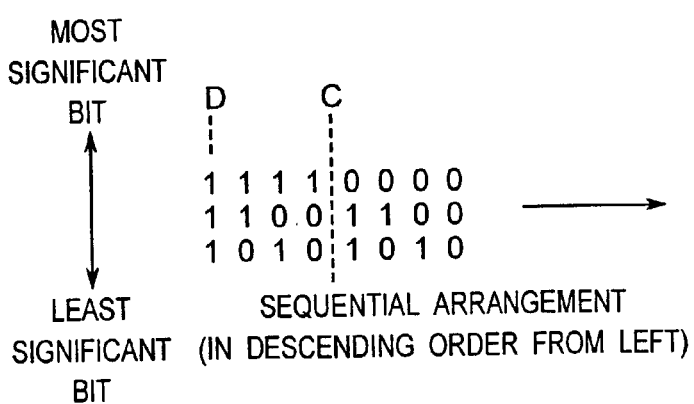      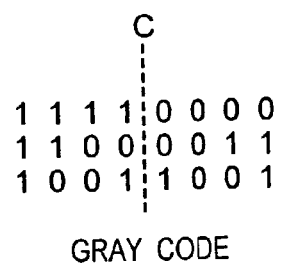
SEQUENTIAL ARRANGEMENT         GRAY CODE
(IN DESCENDING ORDER FROM LEFT)

*Fig.13A*  *Fig.13B*
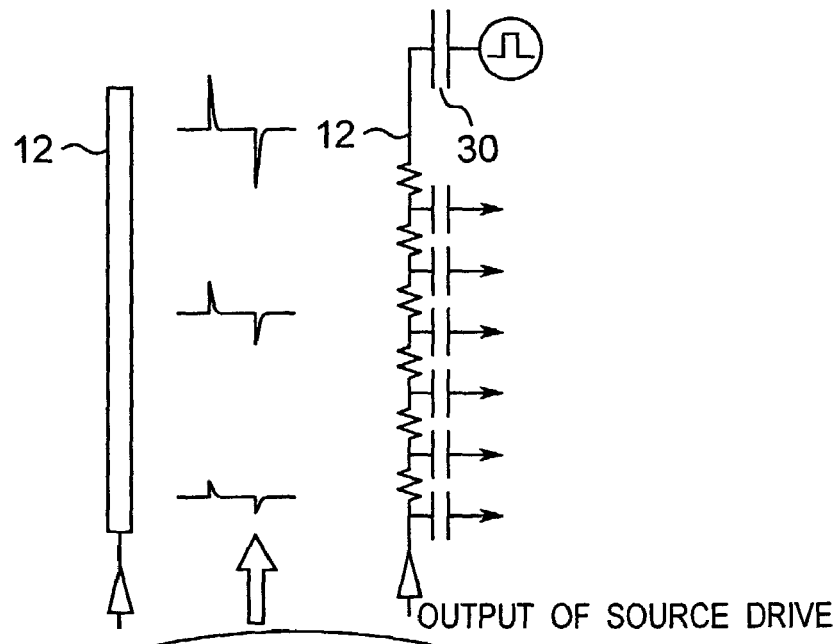
*Fig.13C*
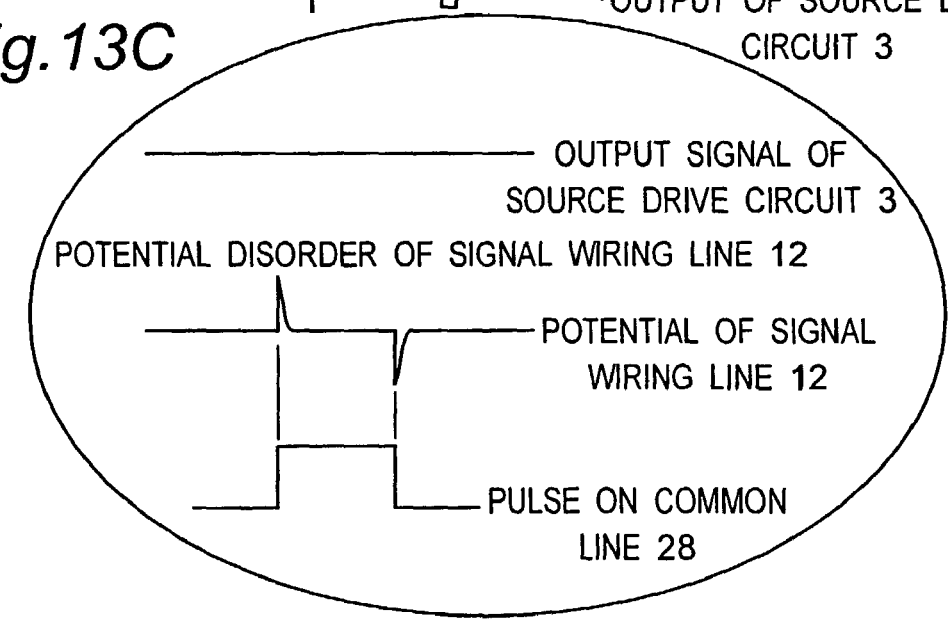

OUTPUT SIGNAL OF SOURCE
DRIVE CIRCUIT 3

POTENTIAL DISORDER OF SIGNAL WIRING LINE 12
POTENTIAL OF SIGNAL (REDUCED)
WIRING LINE 12

PULSE ON COMMON LINE 28
(DULLED)

4TH BIT
↑
1 1 1 1 1 1 1 0 0 0 0 0 0 0 0
1 1 1 1 0 0 0 0 0 0 0 1 1 1 1
1 1 0 0 0 0 1 1 0 0 0 0 1 1
1 0 0 1 1 0 0 1 1 0 0 1 1 0 0 1
↓
1ST BIT

OUTPUT OF SOURCE DRIVE
CIRCUIT 43

INPUT-OUTPUT INTEGRATED TYPE DISPLAY DEVICE

BACKGROUND OF THE INVENTION

The present invention relates to an input-output integrated type display device, which is able to obtain an input position by detecting position information inputted with a pen and to output an image in this obtained position.

Conventionally, a tablet integrated type liquid crystal display, in which a transparent tablet and a liquid crystal display are integrated with each other, has widely been used as an input-output integrated type display device as described above. There are various types of this tablet integrated type liquid crystal display, and a resistance system used for a tablet is most widely adopted.

As the aforementioned conventional tablet integrated type liquid crystal display, there is one formed by sticking a transparent tablet provided independently of a liquid crystal display on the front side of this liquid crystal display to each other. In the case of this structure, the transparent tablet is independently provided on the front side of the liquid crystal display. Therefore, due to the existence of the transparent tablet, there are the problems of a reduction in transmittance of light from the liquid crystal display, an increase in parallax between an input position with a pen and a display position, an increase in cost, an increase in module thickness and module area and so on.

Accordingly, there has been proposed a structure such that an input-output integrated type display device is constructed solely of a display panel by providing the liquid crystal display itself with an input position detection function. For example, Japanese Patent Laid-Open Publication No. HEI 6-314165 discloses a display integrated type tablet device such that a TFT substrate on which row electrodes, column electrodes, TFT's (Thin Film Transistors) and pixel electrodes are formed and an opposite substrate on which opposite electrodes are formed are laminated with each other with interposition of a liquid crystal layer, row electrodes are scanned by inputting a row electrode scanning pulse sequentially to the row electrodes in a display period, column electrodes are scanned by inputting a column electrode scanning pulse sequentially to the column electrodes in a non-display period, the input position is detected on the basis of a voltage induced at the tip electrode of a detection pen due to this scanning, and the input position is displayed in the position. In the case of this display integrated type tablet device, by placing the TFT substrate on the front side, placing the opposite substrate on the rear side and applying light with back light from behind the opposite substrate, high-frequency noises from the back light are interrupted by the opposite electrode, preventing noises from being superimposed on an induced voltage induced at the detection pen.

Moreover, Japanese Patent Laid-Open Publication No. HEI 8-146381 discloses an active matrix type liquid crystal display integrated type tablet. In this official gazette, a rod-shaped metal electrode is arranged on the four sides of the opposite electrode of the active matrix type liquid crystal display (TFT-LCD), and a DC voltage is supplied from each metal electrode to the opposite electrode in a period of operation of writing into the liquid crystal display, making the opposite electrode have same potential. On the other hand, a tablet operation period is time-sharingly divided into a longitudinal detection period and a transversal detection period. In the longitudinal detection period, an AC signal is applied to one of two metal electrodes located at both ends in the longitudinal direction of the opposite electrode, and a voltage of 0 V is applied to the other. Then, the position in the longitudinal direction of the pen is obtained by detecting a potential at the position of the pen. Likewise, the position in the transversal direction of the pen is obtained in the transversal detection period.

However, the aforementioned conventional input-output integrated type display device has the following problems. That is, in the case of the display integrated type tablet device disclosed in Japanese Patent Laid-Open Publication No. HEI 6-314165, which is required to scan both the row electrodes and the column electrodes at the time of input position detection, consumes considerable time for the detection of the input position. Furthermore, since the row electrode scanning is performed in the display period, it is impossible to detect the input position two or more times in one frame period. Moreover, it is required to obtain the position of the detection pen by analyzing the time series of the voltage induced at the detection pen due to the scanning in a shaping manner, and the detection accuracy of the detection pen position is poor. Moreover, there is a problem that the circuit construction becomes complicated in order to perform the scanning.

Furthermore, light such as extraneous light incident from the front side is reflected on the row electrodes and the column electrodes formed on the TFT substrate. Accordingly, there is another problem that contrast is reduced in the portion where the extraneous light exists. Moreover, when the display integrated type tablet device of the aforementioned construction is employed as a reflection type, it is required to provide a reflecting plate, which is normally formed on the TFT substrate concurrently serving as a pixel electrode, on the opposite substrate side where a color filter is formed, and this leads to a problem that the reflection area cannot be secured broad.

On the other hand, in the case of the active matrix type liquid crystal display integrated type tablet disclosed in Japanese Patent Laid-Open Publication No. HEI 8-146381, it is required to arrange a metal electrode on the four sides of the opposite electrode, make the voltage application to the metal electrode in the writing operation period differ from that of the tablet operation period and further change the direction of voltage application with time-sharingly dividing the tablet operation period into the longitudinal detection period and the transversal detection period. This leads to a problem that the mounting form of the peripheral circuit, which controls the voltage application to the opposite electrode, becomes complicated, possibly causing cost increase and module form change. Furthermore, spreading resistance exists in the opposite electrode. Accordingly, there is a problem that the input position detection accuracy is disadvantageously lowered due to the spreading resistance.

SUMMARY OF THE INVENTION

Accordingly, the object of the present invention is to provide an input-output integrated type display device capable of accurately detecting the input position with few changes of the peripheral circuit not depending on electrode scanning without degrading the display quality nor changing the external shape and thickness of the module.

In order to achieve the aforementioned object, according to the first aspect of the present invention, there is provided an input-output integrated type display device comprising:

a display panel having pixels arranged in a matrix form, a plurality of row lines for sequentially selecting the pixels in rows, and a plurality of column lines for applying a display voltage to the selected pixel to which a display signal is inputted;

a display control means for displaying an image on the display panel by inputting a scanning signal to each of the row lines and inputting the display signal to each of the column lines in a display period;

a position information control means for simultaneously applying a position information signal that represents a position on the display panel to the plurality of column lines in a non-display period; and a position detection means, provided with a signal detection section for detecting the position information signal applied to the column line located in the vicinity of a tip portion, for detecting an input position by the signal detection section on the display panel on the basis of the position information signal detected by the signal detection section.

According to the above-mentioned construction, the position information signal that represents the positions on the display panel is simultaneously applied in the non-display period to all the column lines by the position information control means. Then, the position information signal applied to the column line located in the vicinity of the signal detection section is detected by the signal detection section, and the position detection means detects the input position on the display panel by the signal detection section on the basis of this detected position information signal. Therefore, the input position is detected in a very short time within the non-display period of one frame scanning neither the row lines nor the column lines of the display panel.

Moreover, in one embodiment, the position information signal is comprised of a first position information signal that represents a position in the direction of row of the display panel and a second position information signal that represents a position in the direction of column of the display panel, the position information control means time-sequentially applies the first position information signal and the second position information signal, and the position detection means detects the position in the direction of row on the display panel on the basis of the first position information signal and detects the position in the direction of column on the display panel on the basis of the second the position information signal.

According to this embodiment, the position in the direction of row and the position in the direction of column of the display panel are detected while being separated from each other on the basis of the first position information signal and the second position information signal, which are time-sequentially applied from the position information control means. Thus, the position on the display panel is reliably detected.

Moreover, according to the second aspect of the invention, there is provided an input-output integrated type display device comprising:

a liquid crystal display panel having pixel electrodes arranged in a matrix form, switching elements that are arranged in a matrix form and connected to the pixel electrodes, a plurality of scanning lines commonly connected to a control terminal of each of the switching elements arranged in the direction of row, a first insulating substrate on which a plurality of reference wiring lines commonly connected to the pixel electrodes arranged in the direction of row via the switching elements are formed, a second insulating substrate on which a plurality of stripe-shaped signal wiring lines commonly opposite to the pixel electrodes arranged in the direction of column are formed, and a liquid crystal layer held between the first insulating substrate and the second insulating substrate;

a display control means for turning on the switching elements in rows with a scanning signal inputted to the plurality of scanning lines in a display period so as to connect the pixel electrodes to the reference wiring lines and inputting a voltage to the plurality of signal wiring lines according to display data so as to apply a display voltage corresponding to the display data across the pixel electrodes connected to the reference wiring lines and the signal wiring lines;

a position information control means for simultaneously inputting the position information signal that represents a position on the liquid crystal display panel to the plurality of signal wiring lines in a non-display period;

a position information signal detection means for detecting the position information signal inputted to the signal wiring line located in the vicinity of its tip portion; and a position detection means for detecting a tip position of the position information signal detection means on the liquid crystal display panel on the basis of the position information signal detected by the position information signal detection means.

According to the above-mentioned construction, in the non-display period, the position information signal detection means and the position detection means detect the input position on the liquid crystal display panel by the position information signal detection means on the basis of the position information signal simultaneously inputted to all the signal wiring lines by the position information control means. Therefore, the input position is detected in a very short time within the non-display period of one frame scanning neither the scanning lines nor the signal wiring lines of the liquid crystal display panel.

Furthermore, if the signal wiring lines formed on the second insulating substrate are transparently formed of ITO (tin-added indium oxide) film or the like, then irradiation light from the back light is very scarcely reflected on the signal wiring lines even when the first insulating substrate is located on the front side (upper side), and a reduction in display quality due to a reduction in transmittance is restrained.

Furthermore, with a little modification of adding the position information control means for simultaneously inputting the position information signal to the plurality of signal wiring lines to the display control means for displaying an image on the liquid crystal display panel, the detection of the input position can be achieved.

Moreover, in one embodiment, the position information signal is comprised of a first position information signal that represents a position in the direction of row and a second position information signal that represents a position in the direction of column on the liquid crystal display panel, and the first position information signal is a signal that has an amplitude corresponding to the position in the direction of row.

According to this embodiment, the first position information signal has an amplitude corresponding to the position in the direction of row on the liquid crystal display panel, and the first position information signal detected by the position information signal detection means also has information of the amplitude corresponding to the position in the direction of row. Therefore, the position detection means can obtain the position in the direction of row on the liquid crystal display panel through the simple process of merely multiplying the value of the amplitude based on the detected position information signal by the coefficient. Therefore, the detection time of the input position is further shortened.

Moreover, in one embodiment, the amplitude of the first position information signal is set so as to gradually increase or decrease from an input side of the scanning signal.

Moreover, in one embodiment, the position information signal is comprised of a first position information signal that represents a position in the direction of row and a second position information signal that represents a position in the direction of column on the liquid crystal display panel, and the first position information signal is a digital signal that represents the position in the direction of row by a combination of a voltage level that exceeds a reference voltage level and a voltage level that does not exceed the reference voltage level.

According to this embodiment, the second position information signal detected by the position information signal detection means is a digital signal that represents the position in the direction of row. Therefore, the position detection means can obtain the position in the direction of row on the liquid crystal display panel by obtaining the digital value expressed by the detected second position information signal.

Moreover, in one embodiment, the digital signal is expressed by a Gray code.

According to this embodiment, even if the digital signal inputted to the signal wiring line located in the vicinity of the tip portion is erroneously detected by the position information signal detection means, deviation between the actual position of the signal wiring line and the detection position occurs only between mutually adjacent signal wiring lines. Therefore, the position in the direction of column is accurately detected.

Moreover, in one embodiment, a common line, which is formed while being extended in the direction of row on the first insulating substrate and is capacitively coupled with one end portion of each of the plurality of signal wiring lines formed on the second insulating substrate, wherein the position information signal is comprised of a first position information signal that represents a position in the direction of row and a second position information signal that represents a position in the direction of column on the liquid crystal display panel, and the second position information signal is a voltage signal, which is generated in each signal wiring line due to a pulse applied to the common line and has an amplitude that attenuates gradually from the common line side.

According to this embodiment, the second position information signal has an amplitude corresponding to the position in the direction of column on the liquid crystal display panel, and the second position information signal detected by the position information signal detection means also has information of an amplitude corresponding to the position in the direction of column. Therefore, the position detection means can obtain the position in the direction of column on the liquid crystal display panel through the simple process of merely multiplying the value of the amplitude based on the detected position information signal by the coefficient.

Furthermore, since the signal wiring lines are formed in a stripe shape, no spreading resistance occurs. Therefore, the second position information signal generated in the signal wiring line accurately has an amplitude corresponding to the position in the direction of column on the liquid crystal display panel.

Moreover, in one embodiment, the common line is electrically connected to the reference wiring lines.

According to this embodiment, the common line and the reference wiring line are electrically connected to each other. Therefore, the means for retaining the reference wiring line at a voltage of a prescribed level in the display period and the means for applying the pulse to the common line in the non-display period can synergetically serve. Therefore, the construction of the position information control means can be simplified.

Moreover, in one embodiment, the position information control means applies a halftone display voltage to the other end of the plurality of signal wiring lines when applying a pulse to the common line.

According to this embodiment, even in the case of the so-called 1H line inversion drive for inverting the application polarity positive to negative or vice versa every horizontal line, the reference voltage of the signal wiring line can be maintained at a constant voltage during detection in the direction of column. Therefore, noise due to signals other than the signal of position information (aforementioned potential variation) is scarcely superimposed on the second position information signal.

Moreover, in one embodiment, the position information control means generates the pulse to be applied to the common line by intermittently connecting and disconnecting the switching means provided between a power source and the common line.

According to this embodiment, a pulse of a sharp leading edge generated by intermittently connecting and disconnecting the switching means provided between the power source and the common line is applied to the common line. Consequently, the potential variation generated in each signal wiring line due to the pulse is increased.

Moreover, in one embodiment, a common line, which is formed while being extended in the direction of row on the first insulating substrate and is connected to one end portion of each of the plurality of signal wiring lines formed on the second insulating substrate via the switching means, wherein the position information signal is comprised of a first position information signal that represents a position in the direction of row and a second position information signal that represents a position in the direction of column on the liquid crystal display panel, and the second position information signal is a pulse signal, which is generated in each signal wiring line due to a pulse applied to the common line after the switching means is turned on by the position information control means and has an amplitude that attenuates gradually from the common line side.

Moreover, in one embodiment, a common line, which is formed while being extended in the direction of row on the first insulating substrate and is connected to one end portion of each of the plurality of signal wiring lines formed on the second insulating substrate via the switching means, wherein the position information signal is comprised of a first position information signal that represents a position in the direction of row and a second position information signal that represents a position in the direction of column on the liquid crystal display panel, and the second position information signal is a pulse signal, which is applied to the other end of the plurality of signal wiring lines after the switching means is turned on by the position information control means and has an amplitude that attenuates gradually from the other end side.

According to the above-mentioned two embodiments, the second position information signal has an amplitude corresponding to the position in the direction of column on the liquid crystal display panel, and the second position information signal detected by the position information signal detection means also has information of an amplitude corresponding to the position in the direction of column. Therefore, the position detection means can obtain the position in the direction of column on the liquid crystal display panel through the simple process of merely multiplying the value of the amplitude based on the detected position information signal by the coefficient.

Furthermore, since the signal wiring lines are formed in a stripe shape, no spreading resistance occurs. Therefore, the second position information signal generated in the signal wiring line accurately has an amplitude corresponding to the position in the direction of column on the liquid crystal display panel.

Moreover, in one embodiment, the position information signal detection means is provided with a conductor to be capacitively coupled with the signal wiring line located in the vicinity of its tip portion.

According to this embodiment, the position information signal detection means is capacitively coupled with the signal wiring line. Therefore, the voltage information, which is owned by the first position information signal and the second position information signal and corresponds to the position on the liquid crystal display panel, is detected as a voltage variation by the position information signal detection means.

Moreover, in one embodiment, the position information signal detection means is provided with a conductor to be inductively coupled with the signal wiring line located in the vicinity of its tip portion.

According to this embodiment, the position information signal detection means is inductively coupled with the signal wiring line. Therefore, the voltage information, which is owned by the first position information signal and the second position information signal and corresponds to the position on the liquid crystal display panel, is detected as a current variation by the position information signal detection means.

Moreover, in one embodiment, inputting of the first position information signal and detection of the position in the direction of row on the liquid crystal display panel, as well as inputting of the second position information signal and detection of the position in the direction of column on the liquid crystal display panel are time-sequentially performed.

Moreover, in one embodiment, supply of power to the position detection means is stopped except for the period during which the tip position of the position information signal detection means is detected.

According to this embodiment, the power source of the position detection means is shut down during an interval other than the position detection interval, and power consumption is reduced.

Moreover, in one embodiment, the position detection by the position detection means is performed by detecting values of a plurality of portions of the detected one position information signal and using the detection values.

According to this embodiment, the position detection is performed by using the value detected from a plurality of portions of the detected one position information signal. Therefore, it is enabled to detect the value at the peak position of the detected position information signal and the value in the stationary period during which the waveform is stable and obtain the amplitude value which is the difference between the value at the peak position and the value in the stationary period, as position information. Therefore, even if the voltage of the entire position information signal detected is varied by static electricity or the like, the input position by the signal detection section or the tip position of the position information signal detection means is accurately detected.

Moreover, in one embodiment, the detected position information signal has a varying period during which the value largely varies and a stationary period which is located on both sides of the varying period and during which the value is stable, and the detection of the value by the position detection means is performed once in the stationary period and once in the varying period.

According to this embodiment, if the value in the varying period during which the value largely varies is detected at the peak position, then it is enabled to obtain the amplitude value which is the difference between the peak value at the peak position and the value in the stationary period, as position information. Therefore, even if the voltage of the entire position information signal detected is varied by static electricity or the like, the input position by the signal detection section or the tip position of the position information signal detection means is accurately detected.

Moreover, in one embodiment, the detected position information signal has a varying period during which the value largely varies and a stationary period which is located on both sides of the varying period and during which the value is stable, and the detection of the value by the position detection means is performed a plurality of times in the varying period.

According to this embodiment, if the value in the varying period is detected a plurality of times in the vicinity of the peak position, then it is enabled to detect the peak value consistently with stability even when the peak position is shifted in accordance with the amplitude variation of the detected position information signal. Therefore, the input position by the signal detection section or the tip position of the position information signal detection means is accurately detected with stability.

Moreover, according to one embodiment, in the input-output integrated type display device that performs the detection of the value a plurality of times in the varying period, the detection of the value by the position detection means is additionally performed once in the stationary period.

According to this embodiment, it is enabled to obtain the amplitude value as position information from the difference between the value at the peak position in the varying period and the value in the stationary period. Therefore, even if the voltage of the entire position information signal detected is varied by static electricity or the like, the input position by the signal detection section or the tip position of the position information signal detection means is accurately detected. In the above case, by detecting the value a plurality of times in the vicinity of the peak position in the varying period, it is enabled to detect the peak value consistently with stability even when the peak position is shifted in accordance with the amplitude variation of the detected position information signal. Therefore, the input position by the signal detection section or the tip position of the position information signal detection means is accurately detected with stability.

Moreover, according to one embodiment, in the input-output integrated type display device that performs the detection of the value a plurality of times in the varying period, the detection of the value by the position detection means is additionally performed a plurality of times in the stationary period.

According to this embodiment, it is enabled to obtain the amplitude value as position information from the difference between the value at the peak position in the varying period and the value in the stationary period. Therefore, even if the voltage of the entire position information signal detected is varied by static electricity or the like, the input position by the signal detection section or the tip position of the position information signal detection means is accurately detected. In the above case, by detecting the value a plurality of times in the vicinity of the peak position in the varying period, it is enabled to detect the peak value consistently with stability. By using the detection value in the stationary period as the mean value of the values detected a plurality of times, the steady-state value can be detected more accurately. Therefore, the input position by the signal detection section or the tip position of the position information signal detection means is more accurately detected with stability.

Moreover, according to one embodiment, in the input-output integrated type display device that performs the position detection by using the values detected from a plurality of portions of the detected one position information signal, the position detection means uses a value obtained by subtracting a second detection value based on the value detected in the stationary period from a first detection value based on the value detected in the varying period as position information. It is to be herein noted that the first detection value and the second detection value conceptually include the detected values themselves.

According to this embodiment, by performing the detection of the value in the varying period in the vicinity of the peak position, it is enabled to obtain the amplitude value, which is the difference between the peak value and the steady-state value, as position information. With regard to the first detection value, if there is one detected value, then the value should desirably be used. If there is a plurality of detected values, then the maximum value should desirably be used. Furthermore, with regard to the second detection value, if there is one detected value, then the value should desirably be used. If there is a plurality of detected values, then the mean value should desirably be used.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 5 is an explanatory view of an input position detection system in the display panel;

FIG. 6 is an enlarged sectional view of a region A in FIG. 5;

FIGS. 7A, 7B and 7C are explanatory views of a display period, a non-display period, an x-detection period, a y-detection period and an idle period in one frame period;

FIG. 11 is an explanatory view of a method for reproducing digital information by a coordinate detection circuit in FIG. 1;

FIGS. 12A and 12B are explanatory views of a Gray code;

FIGS. 13A, 13B and 13C are explanatory views of the principle of y-coordinate detection by the input position detection system shown in FIG. 5 and a potential variation that occurs in the signal wiring line;

FIG. 21 is an explanatory view of a voltage variation of the induced voltage signal caused by static electricity due to friction between the pen point and the display panel surface, or the like;

DETAILED DESCRIPTION OF THE PREFERRED EMBODIMENTS

Figure 1:
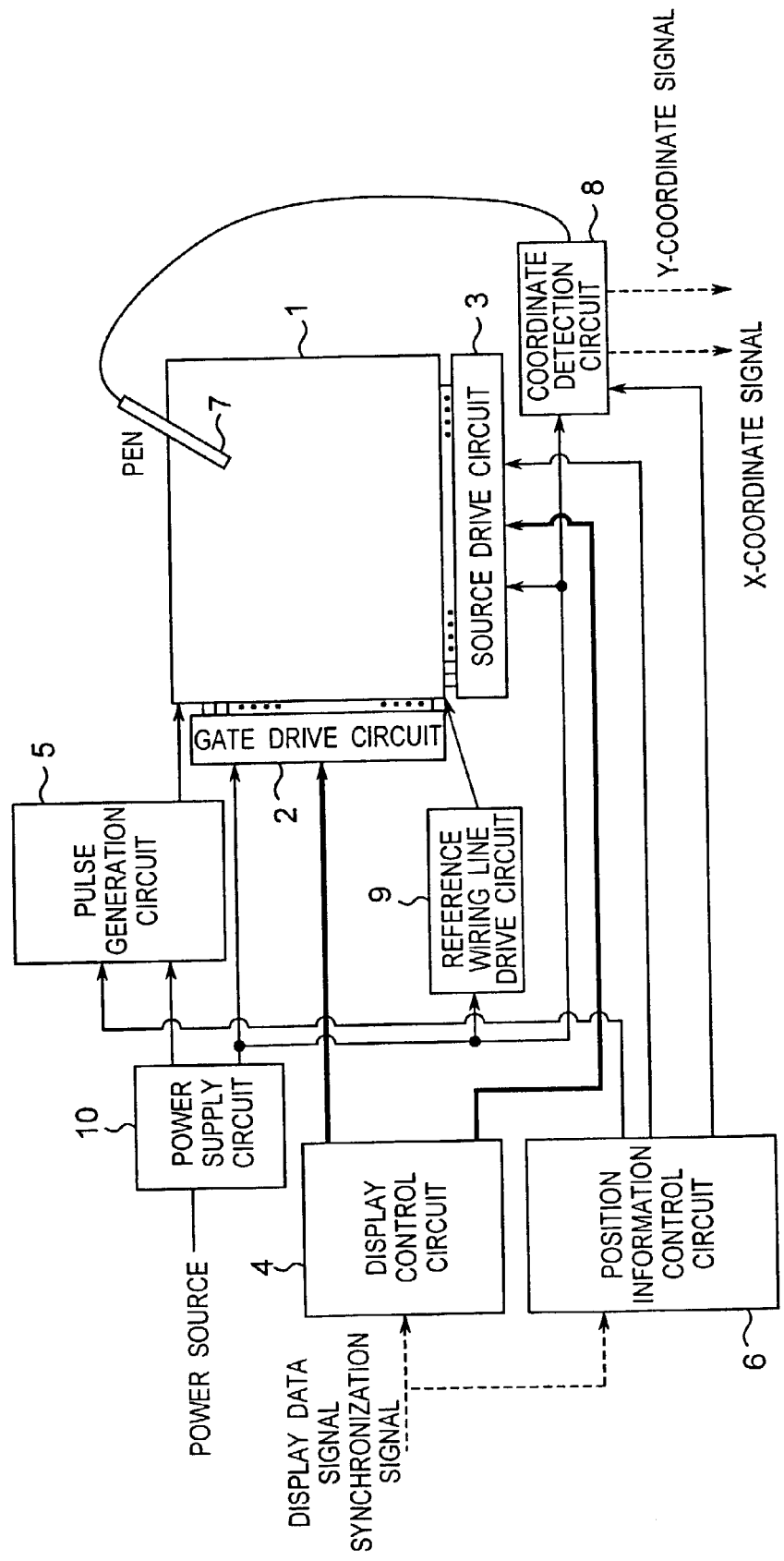
FIG. 1 is a block diagram of an input-output integrated type tablet device of the present invention.

The present invention will be described in detail below on the basis of the embodiments shown in the drawings.

First Embodiment

FIG. 1 is a block diagram of an input-output integrated type tablet device of the present embodiment. This input-output integrated type tablet device is constructed roughly of an active matrix type liquid-crystal display panel (hereinafter referred to simply as a display panel) 1 that concurrently has an image display function and an electrostatic induction tablet function, a gate drive circuit 2 and a source drive circuit 3 for driving this display panel 1, a display control circuit 4 that supplies a display control signal to the gate drive circuit 2 and the source drive circuit 3, a position information control circuit 6 that supplies a position information control signal to the source drive circuit 3, a pulse generation circuit 5 and a coordinate detection circuit 8 that receives a signal from a pen 7 and detects the coordinates at the tip of the pen 7 on the display panel 1.

Figure 2:
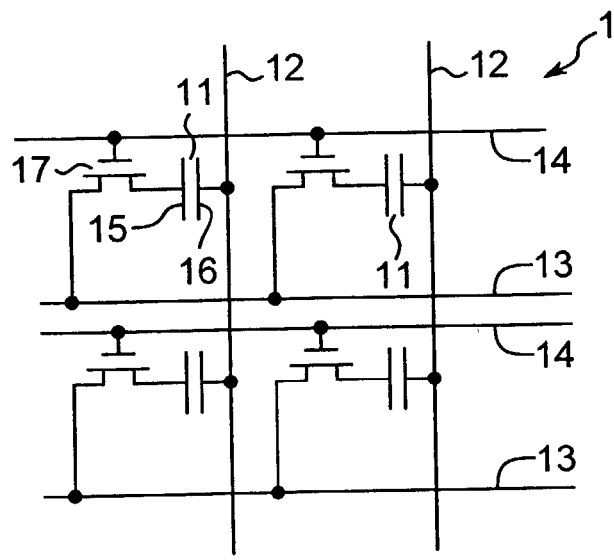
FIG. 2 is an equivalent circuit diagram of a display panel in FIG. 1.

FIG. 2 shows an equivalent circuit of the display panel 1. The display panel 1 has a plurality of liquid crystal capacitances 11 arranged in a matrix form and constituting respective pixels. A signal wiring line 12 is arranged between the columns of the liquid crystal capacitances 11, while a reference wiring line 13 and a scanning line 14 are wired between the rows of the liquid crystal capacitances 11. Each of the liquid crystal capacitances 11 is constructed by holding liquid crystals between a pixel electrode 15 and an opposite electrode 16, which are opposed to each other. A TFT 17 is arranged as a switching element in each pixel. Then, the TFT 17 has a source connected to the pixel electrode 15, a drain connected to the reference wiring line 13 and a gate connected to the scanning line 14. Further, the signal wiring line 12 is connected to the opposite electrode 16. Thus, the TFT 17 is controlled to be turned on and off by an electrical signal supplied from the scanning line 14. When the TFT is on, a voltage corresponding to a display data signal applied across the reference wiring line 13 and the signal wiring line 12 is retained in the liquid crystal capacitance 11 and also retained when the TFT 17 is off.

Figure 3:
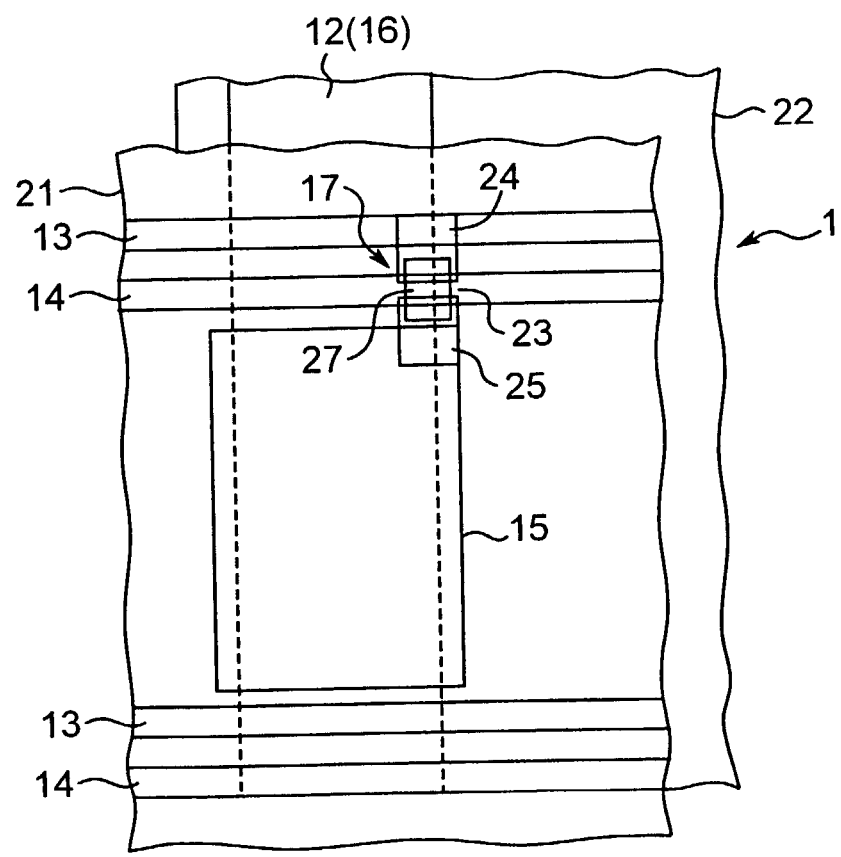
FIG. 3 is a plan view of one pixel of the display panel.
Figure 4:
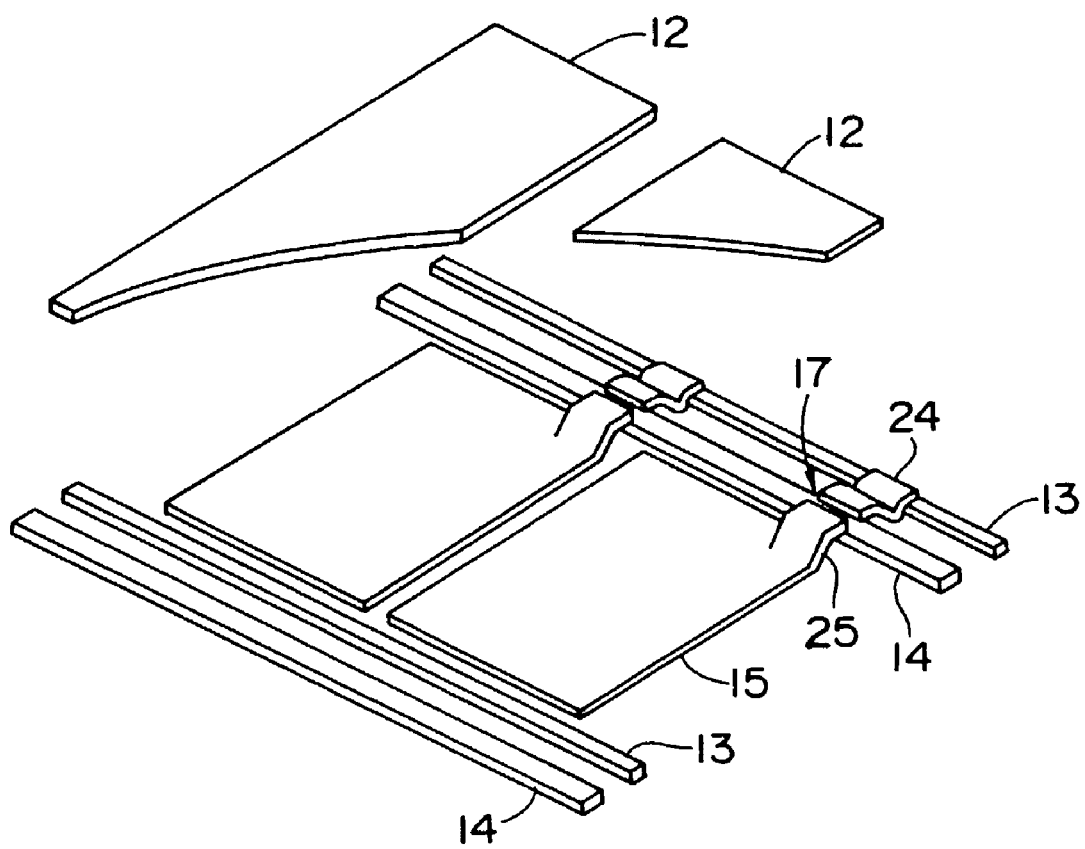
FIG. 4 is a perspective view of two pixels of the display panel.

FIG. 3 is a schematic plan view of one pixel of the display panel 1, while FIG. 4 is a schematic perspective view of two pixels. A concrete pixel construction when the switching element is a TFT will be described referring to FIGS. 3 and 4. The display panel 1 is constructed roughly of a TFT substrate 21 that is made of glass or the like and has insulating properties, an opposite substrate 22 that is made of glass or the like and arranged opposite to this TFT substrate 21 with interposition of a specified interval and has optical transparency, and a liquid crystal layer (not shown) held between the TFT substrate 21 and the opposite substrate 22.

On the TFT substrate 21, there are formed the TFT 17, the scanning line 14 that partially becomes the gate electrode 23 of the TFT 17, the reference wiring line 13 electrically connected to the drain electrode 24 of the TFT 17 and the pixel electrode 15 electrically connected to the source electrode 25 of the TFT 17. Although the reference wiring line 13 and the scanning line 14 are formed of the same metallic layer of a tantalum layer or the like, the lines may be formed of different metallic layers. Moreover, a gate insulation film (not shown) of a silicon nitride film or the like is typically formed roughly on the entire surface of the TFT substrate 21 so as to cover the gate electrode 23 of the TFT 17 and the scanning line 14. Then, an active semiconductor layer 27, the drain electrode 24 and the source electrode 25, which constitute the TFT 17 and the pixel electrode 15, are formed on this gate insulation film. The pixel electrode 15 is formed of a transparent conductive film of ITO (Indium Tin Oxide) or the like. Moreover, in FIG. 3, for the convenience of explanation, the TFT 17, the scanning lines 14, the reference wiring lines 13 and the pixel electrode 15 are illustrated as if they were seen through the TFT substrate 21.

On the other hand, a stripe-shaped opposite electrode 16, which is common to all the pixels arranged in the direction of column, is formed on the opposite substrate 22. This opposite electrode 16 is transparently formed of an ITO layer or the like, and its one end is electrically connected to a signal wiring line input section formed of an anisotropic conductive film or the like on the TFT substrate 21 in a transfer section provided outside the display region of the display panel 1. That is, the stripe-shaped opposite electrode 16 of the present embodiment also functions as the signal wiring line 12. The opposite electrode 16 is hereinafter referred to as the signal wiring line 12. For the liquid crystal layer held between the TFT substrate 21 and the opposite substrate 22, various types of liquid crystal layers can be employed.

Moreover, as shown in FIG. 5, the other end of the signal wiring line 12 extends to the outside of the display region 1a on the opposite substrate 22 and intersects one common line 28 formed parallel to the scanning line 14 on the TFT substrate 21 outside this display region 1a. Although the one signal wiring line 12 is representative in FIG. 5, the same thing can be said for the other signal wiring lines 12. FIG. 6 is an enlarged sectional view of the intersection region A of the signal wiring line 12 and the common line 28. The signal wiring line 12 and the common line 28 are laminated with each other via a dielectric of a liquid crystal layer 29 or the like and intentionally form capacitance outside the display region 1a as described above. Then, as shown in FIG. 5, a pulse generation circuit 5 is connected to one end of the common line 28, and a pulse waveform is inputted thereto within a certain period of a non-display period.

As described above, in the display panel 1 of the present embodiment, the signal line 12 corresponding to the column electrode of the aforementioned prior art technology of Japanese Patent Laid-Open Publication No. HEI 6-314165 is transparently formed to have the function of the opposite electrode and formed on the opposite substrate 21 side. Therefore, even when the TFT substrate 21 is located on the front side, light such as extraneous light incident from the front side is scarcely reflected on the signal line 12 formed of an ITO film on the opposite substrate 21 side. Therefore, a reduction in display quality due to a reduction in contrast in a location where extraneous light exists can be restrained.

The gate drive circuit 2 performs scanning by sequentially applying a scanning pulse to each of the scanning lines 14 of the display panel 1 on the basis of a display control signal from the display control circuit 4. Then, the TFT 17, whose gate electrode is provided by part of the scanning line 14 to which the scanning pulse is applied, is turned on. On the other hand, the source drive circuit 3 applies a drive pulse corresponding to the display data signal to the signal wiring line 12 via the signal wiring line input section in synchronization with the scanning of the gate electrodes on the basis of the display control signal. Then, the drive pulse is applied to the liquid crystal capacitance 11 of the TFT 17 which has been turned on, and image information is written.

Moreover, as described in detail later, the source drive circuit 3 simultaneously applies a position information signal that represents the position of each signal wiring line 12 to all the signal wiring lines 12 independently of the application of the drive pulse on the basis of a position information control signal from the position information control circuit 6. Further, a pulse signal of one pulse is applied to the common line 28 by the pulse generation circuit 5 on the basis of the position information control signal. It is to be noted that the scanning pulse generated by the gate drive circuit 2, the drive pulse and the position information signal generated by the source drive circuit 3 and the pulse signal generated by the pulse generation circuit 5 are generated with a bias voltage from a power circuit 10.

The display control circuit 4 generates a display control signal for displaying an image on the display panel 1 on the basis of a display data signal and a synchronization signal inputted from the outside. Then, this generated display control signal is sent to the gate drive circuit 2 and the source drive circuit 3 to control the operation of the gate drive circuit 2 and the source drive circuit 3. On the other hand, the position information control circuit 6 generates a position information control signal for detecting the coordinates at the tip of the pen 7 on the basis of the synchronization signal and sends the signal to the source drive circuit 3, the pulse generation circuit 5 and the coordinate detection circuit 8.

The reference wiring line drive circuit 9 applies a reference voltage at a prescribed level generated by the bias voltage from the power circuit 10 to the reference wiring line 13 of the display panel 1.

The pen 7 has at its tip a detection electrode (not shown) which is coupled with the signal wiring line 12 of the display panel 1 via stray capacitance and has high input impedance. An induced voltage is induced at the detection electrode due to the position information signal generated in the signal wiring line 12 on the basis of the position information signal applied to the signal wiring line 12 and the pulse signal applied to the common line 28. The coordinate detection circuit 8 detects the coordinate detection timing on the basis of the position information control signal from the position information control circuit 6 and detects the coordinates at the tip of the pen 7 according to an induced voltage signal from the pen 7.

That is, in the present embodiment, the display control means is constructed of the display control circuit 4, the gate drive circuit 2, the source drive circuit 3 and the reference wiring line drive circuit 9. The position information control means is constructed of the position information control circuit 6, the source drive circuit 3 and the pulse generation circuit 5. The signal detection section and the position information signal detection means are constructed of the pen 7. Moreover, the position detection means is constructed of the coordinate detection circuit 8.

If the coordinates at the tip of the pen 7 are detected by the coordinate detection circuit 8 as described above, then an x-coordinate signal and a y-coordinate signal which represent the tip coordinates, are outputted from the coordinate detection circuit 8. Then, the display data signal for displaying a dot image at the tip position of the pen 7 on the display panel 1 on the basis of the x-coordinate signal and the y-coordinate signal is generated by a display data signal generation means (not shown since this is not directly related to the present embodiment) and inputted to the display control circuit 4 as described above. As a result, a dot image is displayed at the tip position of the pen 7 on the display panel 1 by the operation of the display control circuit 4, the gate drive circuit 2 and the source drive circuit 3.

Thus, a letter, a symbol and a picture can be written on the display panel 1 with the pen 7 as if they were handwritten on a paper with writing materials. In addition, it is allowed to recognize the input letter and the input symbol according to a change in the x-coordinate signal and the y-coordinate signal by a recognition means (not shown) and perform documentation, control commanding and so on using the recognition results. It is, of course, possible to use the pen as a response means for an icon displayed on the display panel 1.

As described above, in the present embodiment, the detection electrode of the pen 7 is coupled with the signal wiring line 12 on the opposite substrate 22 via stray capacitance. Therefore, it is more advantageous for the position detection to arrange the display panel 1 with the opposite substrate 22 located on the front side (i.e., on the upper side) in terms of increasing the capacitive coupling of the tip electrode of the pen 7 with the signal wiring line 12. Even in the above case, the signal wiring line 12 which is formed of the ITO film, does not reflect light such as extraneous light incident from the front side. Therefore, a reduction in display quality due to a reduction in contrast in the location where extraneous light exists can be restrained.

The operation of the input-output integrated type display device of the aforementioned construction will be described next. As shown in FIG. 7A, one frame period is time-sharingly divided into a display period during which an image is displayed on the display panel 1 and a non-display period of a vertical blanking interval or the like. The display period will be simply described since the period is basically the same as that of the display integrated type tablet device disclosed in Japanese Patent Laid-Open Publication No. HEI 6-314165 and the normal active matrix type liquid crystal display device. That is, the scanning lines 14 are scanned by the gate drive circuit 2 on the basis of the display control signal from the display control circuit 4 so as to sequentially turn on the TFT's 17 every row and apply a voltage signal corresponding to the display data from the source drive circuit 3 to all the signal wiring lines 12. Then, an image is displayed by retaining the voltage corresponding to the display data in the liquid crystal capacitance 11 connected to the TFT 17 turned on.

On the other hand, the non-display period is partially allocated to a position detection period as shown in FIG. 7B. Then, the position detection period is further time-sharingly divided into an x-detection period and a y-detection period. Operation in the x-detection period will be described first.

Figure 8:
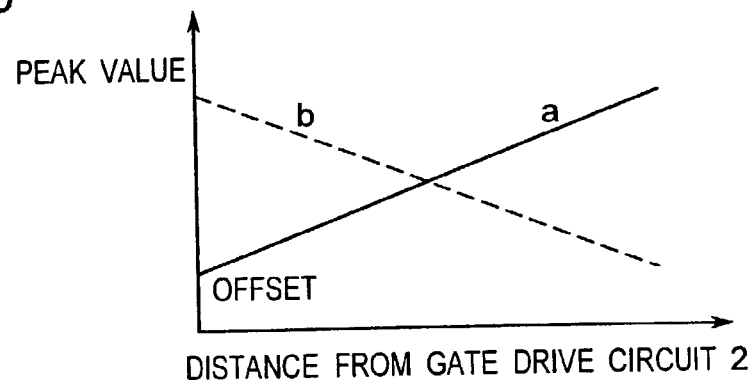
FIG. 8 is a graph showing a relation between a distance from a gate drive circuit side to each signal wiring line and a peak value of a position information signal.
Figure 9:
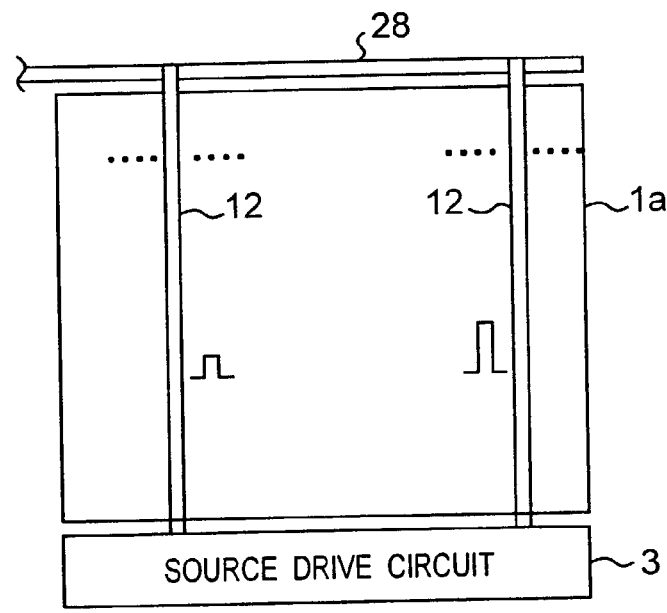
FIG. 9 is a view showing one example of the peak values of pulses applied to the signal wiring lines in the case of a relation between the distance and peak value indicated by "a" in FIG. 8.

In the x-detection period, the position information signal is simultaneously applied from the source drive circuit 3 to all the signal wiring lines 12. In the above case, a relation between a distance from the gate drive circuit 2 to each signal wiring line 12 and the peak value of the applied position information signal is preparatorily set as shown in FIG. 8. With this arrangement, if the above-mentioned relation is set as indicated by, for example, "a" in FIG. 8, then a pulse of a peak value proportional to the distance (i.e., x-coordinate) from the gate drive circuit 2 side is applied to each signal wiring line 12 of the display panel 1 as shown in FIG. 9. Therefore, an induced voltage corresponding to the peak value (i.e., x-coordinate) of the pulse applied to the signal wiring line 12 at the position where the pen point is located is induced in the tip electrode of the pen 7.

The coordinate detection circuit 8 subjects the analog information of the voltage value from the pen 7 to A-to-D conversion in the x-detection period on the basis of the position information control signal from the position information control circuit 6 and obtains the x-coordinate on the basis of the obtained digital information.

The relation between the distance from the gate drive circuit 2 to each signal wiring line 12 and the peak value of the applied position information signal may be set proportionally as indicated by "a" or inversely proportionally as indicated by "b" in FIG. 8. What is essential is that the peak value of the position information signal is set in an ascending order or a descending order in the x-direction. With this arrangement, the x-coordinate can be obtained merely by multiplying the digital value of the induced voltage from the pen 7 by a coefficient. This obviates the need for converting the digital value of the induced voltage into the x-coordinate by means of a preparatorily formed table or the like, allowing the x-coordinate to be obtained at higher speed.

Figure 10:
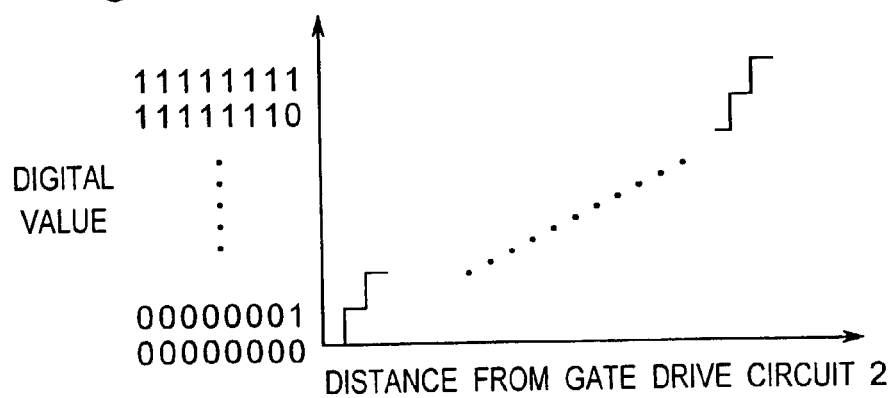
FIG. 10 is a graph showing a relation between the distance from the gate drive circuit to each signal wiring line and the digital value of the position information signal.

Moreover, the x-coordinate detection can also be achieved in the following manner. That is, the position information signal simultaneously applied from the source drive circuit 3 to all the signal wiring lines 12 is expressed by a digital signal of a plurality of bits. In the above case, a relation between the distance from each signal wiring line 12 to the gate drive circuit 2 and the digital value to be applied is set in an ascending order in the x-direction as shown in FIG. 10. If, for example, an 8-bit digital value "10010111" is applied to the signal wiring line 12, then the digital value is applied time-sequentially from the most significant bit of "1" to the least significant bit of "1" with an H-level voltage value assigned to the value "1" and an L-level voltage value assigned to the value "0". In this case, the H-level voltage value is a voltage value that exceeds an arbitrarily set reference voltage level. On the other hand, the L-level voltage value is a voltage value that does not exceed the reference voltage level.

Then, the coordinate detection circuit 8 obtains digital information as shown in FIG. 11 by subjecting the analog information of the voltage value from the pen 7 to A-to-D conversion. Then, the obtained digital information is sampled in a prescribed sampling period by the number ("8" in the case of the 8-bit digital signal) of sampling corresponding to the number of digits of the digital signal applied to the signal wiring line 12. Further, the x-coordinate is obtained by expressing the 8-bit digital value "10010111" applied to the signal wiring line 12 located in the vicinity of the tip of the pen 7 with "1" determined when the sampling value is not smaller than the threshold value and "0" determined when the sampling value is smaller than the threshold value. Although the relation between the distance of the signal wiring line 12 and the digital value has an ascending order in the x-direction in FIG. 10, the relation may have a descending order.

When the position information signal is expressed by a digital signal of a plurality of bits as described above, it is practically desirable to apply a Gray code which is obtained by converting the digital value set in an ascending order or a descending order in the x-direction as shown in FIG. 10, to the signal wiring line 12. In detail, it is assumed that, when, for example, a 3-bit digital value is set in a descending order in the x-direction as shown in FIG. 12A, the pen 7 is located in a boundary position C of the signal wiring line to which the digital value "100" is applied and the signal wiring line to which the digital value "011" is applied. When an induced voltage of which the most significant bit is "1" and the low-order two bits are "11" is induced and a digital value "111" is reproduced by the coordinate detection circuit 8, it is misrecognized that the pen position is illusorily located in a position D far apart from the actual position C of the pen 7. That is, a deviation occurs between the tip position of the pen 7 and the display position. This phenomenon becomes more serious as the number of bits increases. There are generated various kinds of patterns of the deviation between the tip position of the pen 7 and the display position due to the erroneous detection of each bit, consequently failing in following the correct input position.

Accordingly, mutually adjacent two pieces of digital data are converted from the bit pattern of FIG. 12A into a Gray code whose arbitrary one bit is only varied as shown in FIG. 12B and applied. Then, even when the pen 7 is located at the same position C as the position C in FIG. 12A, the digital value "101" and the digital values "001", which are located on both sides of the position C, have their most significant bits only varied. Therefore, in what manner a misrecognition occurs, the deviation between the tip position of the pen 7 and the display position occurs only between the mutually adjacent signal wiring lines 12. Therefore, the correct input position can be followed.

It is proper to perform the conversion into the Gray code by, for example, the position information control circuit 6. With regard to the conversion into the Gray code in the above case, the most significant bit of each of the digital values arranged in a descending order as shown in FIG. 12A is first made to be the most significant bit of the Gray code without modification. Subsequently, the digital values shown in FIG. 12A are verified sequentially from the most significant bit. If the value of the objective bit is "1", then the value of the same bit as that of the digital value shown in FIG. 12A is used as the value of a one-bit lower bit in the Gray code. If the value of the objective bit is "0", then a value obtained by inverting the value of the same bit as that of the digital value shown in FIG. 12A is used.

Then, the coordinate detection circuit 8 obtains the position of the corresponding signal wiring line 12 by inverting the reproduced Gray code into the digital value in a descending order as shown in FIG. 12A. With regard to the inversion in the above case, the most significant bit in the Gray code is first made to be the most significant bit of the digital value shown in FIG. 12A without modification. Subsequently, the digital value obtained after the inversion is verified. If the value of the objective bit is "1", then the value of the same bit as in the Gray code is used as the value of a one-bit lower bit in the digital value shown in 12A. If the value of the objective bit is "0", then a value obtained by inverting the value of the same bit as in the Gray code is used.

As described above, since the signal-to-noise ratio can be made greater than when the analog value is inputted by expressing the position information signal applied to each signal wiring line 12 as the digital information, there is the advantage that the information is tolerant to noise. In another aspect, the sampling frequency of the digital information obtained by subjecting the analog information from the pen 7 to A-to-D conversion increases in proportion to the number of bits, and therefore, considerable time is required for obtaining the x-coordinate.

The y-detection period will be described next. As described above, the end, which belongs to each signal wiring line 12 and is located on the opposite side of the source drive circuit 3, intentionally forms capacitance by intersecting the common line 28 outside the display region 1a of the opposite substrate 22. It is now assumed that this capacitance is a capacitance 30 as shown in FIG. 13B. Then, one pulse is inputted from the pulse generation circuit 5 to the common line 28 in the y-detection period as shown in FIG. 13B.

Then, the potential variation of the common line 28 (i.e., one electrode of the capacitance 30) is transmitted to the signal wiring line 12 via the capacitance 30, and a spike-shaped potential disorder occurs in the signal wiring line 12 in synchronization with the rise and fall of the potential of the common line 28 as shown in FIG. 13C. Then, as shown in FIG. 13A and FIG. 13B, the amplitude of the spike-shaped potential variation becomes successively reduced from the capacitance 30 of the signal wiring line 12 toward the source drive circuit 3 due to the wiring resistance of the signal line 12 itself. Therefore, the height of the spike-shaped potential variation becomes the information of the y-coordinate. That is, a voltage signal, which represents the spike-shaped potential variation, becomes the position information signal. Accordingly, similarly to the case of the x-coordinate detection described above, this spike-shaped potential variation is detected as an induced voltage to the tip electrode of the pen 7, and the y-coordinate is obtained on the basis of the digital information obtained by subjecting the analog information of the voltage value from the pen 7 to A-to-D conversion in the y-detection period by the coordinate detection circuit 8 on the basis of the position information control signal from the position information control circuit 6.

In this case, as shown in FIG. 13C, the output voltage from the source drive circuit 3 to the signal wiring line 12 should better be a direct current in the y-detection period. The reason for the above is that noise is less superimposed due to signals other than the position information (spike-shaped potential variation) on the signal wiring line 12 when the output from the source drive circuit 3 is a direct current. Therefore, when the display system of the display panel 1 is the so-called 1H-line inversion drive for inverting the potential polarity to the positive polarity or the negative polarity every one horizontal line, the source drive circuit 3 outputs a constant voltage of half tone.

Figures 14A, 14B, 14C, 15, 16:
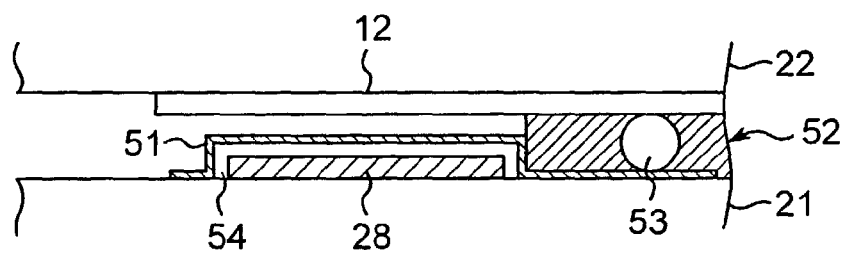
FIGS. 14A, 14B and 14C are explanatory views of the influence of dullness at the rise time of an input pulse to a common line, exerted on the potential variation in the signal wiring line.
FIG. 15 is a sectional view of a capacitance formed of a signal wiring line different from that of FIG. 6 and the common line.
FIG. 16 is an explanatory view of the fact that the number of succession of same values in an x-direction differs each bit in the case of the Gray code.

Moreover, the spike-shaped potential variation of the signal wiring line 12 becomes larger as the waveform of the pulse applied to the common line 28 becomes steeper, and this allows the position information to be easily detected by the coordinate detection circuit 8. According to experiments, if the pulse waveform was dulled to the extent that the rise time of the waveform of the pulse to the common line 28 exceeded 10% (2 μs) of the pulse width as shown in FIG. 14C, then the spike-shaped potential variation of the signal wiring line 12 became very small as shown in FIG. 14B, and the position information of the y-coordinate became very hard to obtain. It is to be noted that the pulse of the waveform that has a sharp leading edge as described above can be generated by, for example, turning on and off a switching element in the pulse generation circuit 5 (between the power circuit 10 and the common line 28) without using an amplifier.

In this case, the coordinate detection circuit 8 is operated only in the position detection period shown in FIG. 7B on the basis of the position information control signal from the position information control circuit 6, and the power from the power circuit 10 is turned off and stopped in the period other than the position detection period as shown in FIG. 7C. Thus, the power consumption is reduced. To turn off the power of this coordinate detection circuit 8 and reduce the power consumption produces great effects when the position detection period is very short as in the present embodiment.

As described above, in the present embodiment, the display panel 1 is constructed of the mutually opposite TFT substrate 21 and opposite substrate 22 with interposition of the liquid crystal layer 29. Then, the TFT 17, the scanning line 14, the reference wiring line 13 and the pixel electrode 15 are formed on the TFT substrate 21. On the other hand, the stripe-shaped signal wiring lines 12 are formed of an ITO layer or the like in columns of pixels on the opposite substrate 22 and made to have a function as an opposite electrode. Moreover, one common line 28 is formed parallel to the scanning line 14 outside the display region 1a on the TFT substrate 21 and made to intersect the one end of each signal wiring line 12 formed on the opposite substrate 22. Thus, the capacitance 30 is constituted of the signal wiring line 12, the common line 28 and the liquid crystal layer 29. On the other hand, the other end of each signal wiring line 12 is connected to the source drive circuit 3.

When detecting the x-coordinate at the tip of the pen 7 on the display panel 1, the position information signal which is constructed of the pulse of a peak value proportional (inversely proportional) to the distance from the gate drive circuit 2 is simultaneously applied from the source drive circuit 3 to all the signal wiring lines 12 in the x-detection period of the non-display period in one frame period. In the above case, the induced voltage (analog information) induced at the tip electrode of the pen 7 according to the peak value (i.e., x-coordinate) of the pulse applied to the signal wiring line 12 located at the tip position of the pen 7 is subjected to A-to-D conversion by the coordinate detection circuit 8, and the x-coordinate is obtained on the basis of the obtained digital information.

On the other hand, one pulse is inputted from the pulse generation circuit 5 to the common line 28 in the y-detection period of the non-display period. Then, the spike-shaped potential variation (position information signal), which has an amplitude proportional to the distance (y-coordinate) from the source drive circuit 3 and occurs roughly simultaneously on all the signal wiring lines 12 via the capacitance 30, is detected by the tip electrode of the pen 7, and the y-coordinate is obtained on the basis of digital information obtained through the A-to-D conversion by the coordinate detection circuit 8 similarly to the case of the x-coordinate detection.

Therefore, in the case of the present embodiment, neither the scanning lines 14 nor the signal wiring lines 12 of the display panel 1 is required to be scanned by sequentially applying a scanning pulse to them in detecting the tip position of the pen 7, and the input position by the pen 7 can be detected in a very short time within the non-display period of one frame. Moreover, the signal detected by the pen 7 is a voltage signal proportional to the x- and y-coordinates at the tip of the pen 7. Therefore, the coordinate detection circuit 8 can obtain the x- and y-coordinates through the simple process of merely subjecting the analog signal from the pen 7 to A-to-D conversion and multiplying the resulting signal by a constant, and the input position by the pen 7 can be accurately detected in a shorter time.

That is, according to the present embodiment, as shown in FIG. 7B, the position detection period length can be made shorter than the non-display period length, allowing the pen input position to be detected a plurality of times in one frame period. Therefore, the pen input position can be accurately detected in comparison with that of Japanese Patent Laid-Open Publication No. HEI 6-314165 that performs the detection once.

Moreover, the use of the resistance system for the detection of the y-coordinate is similar to that of the active matrix type liquid crystal display integrated type tablet disclosed in Japanese Patent Laid-Open Publication No. HEI 8-146381. However, in the case of the present embodiment, the object to which the position information signal is applied is the stripe-shaped signal wiring line 12, and therefore, no spreading resistance is generated. Therefore, input position detection accuracy is also not reduced.

Furthermore, in the present embodiment, the signal lines 12 are transparently formed of the ITO film on the opposite substrate 21 side. Therefore, even when the TFT substrate 21 is located on the front side, light such as extraneous light incident from the front side is scarcely reflected on the signal wiring lines 12. Therefore, the reduction in display quality due to the reduction in contrast in the portion where extraneous light exists can be restrained to a considerable extent. Furthermore, even when the display is used as a reflection type, there is no problem since a reflecting plate, which concurrently serves as the pixel electrode 15, can be formed on the TFT substrate 21.

Moreover, the signal input in the display period of the display panel 1 and in the x-coordinate detection period of the position detection period are performed by the gate drive circuit 2 and the source drive circuit 3, which serve as the normal liquid crystal panel display means, and one pulse is only inputted from the pulse generation circuit 5 to the common line 28, which forms the capacitance 30 while intersecting the one end of each signal wiring line 12 in the y-coordinate period, providing a very simple construction. Therefore, no complicated peripheral circuit for controlling the signal applied to the signal wiring lines 12 is needed, and there is neither cost increase nor module transformation.

As the position information signal, which is proportional (or inversely proportional) to the distance from the gate drive circuit 2 and is simultaneously applied from the source drive circuit 3 to each signal interconnection line 12 in the x-detection period, it is acceptable to apply a signal of a combination of the voltage levels of "H" and "L" corresponding to each bit value of the digital value (or a value converted into the Gray code) proportional (or inversely proportional) to the distance besides the pulse signal of the peak value proportional (or inversely proportional) to the distance. What is essential is that the signal is only required to be a voltage signal including the information proportional (or inversely proportional) to the distance from the gate drive circuit 2.

Moreover, the common line 28, which forms the signal wiring line 12 and the capacitance 30, may be electrically connected to the reference wiring line 13 of the display panel 1. With this arrangement, the reference wiring line drive circuit 9, which applies the reference voltage at a prescribed level to the reference wiring line 13 of the display panel 1, can be substituted by the pulse generation circuit 5. Therefore, the reference wiring line drive circuit 9 is not necessary, and the peripheral circuit can further be simplified. Since the voltage variation of the reference wiring line 13 due to the application of the pulse to the common line 28 in the above case occurs in the non-display period, no influence is exerted on the display image.

By the way, the capacitance 30 formed between the other end of the signal wiring line 12 and the common line 28 in the present embodiment is constituted by holding the liquid crystal layer 29 between them. However, it is also possible to constitute the capacitance formed of the other end of the signal wiring line 12 and the common line 28 in a manner as shown in FIG. 15. That is, a stripe-shaped upper electrode 51, which has the same width as that of the signal wiring line 12 and perpendicularly intersects the common line 28, is provided on the gate insulation film 54 of the TFT substrate 21 below the signal wiring line 12 and connected to the signal wiring line 12 on the opposite substrate 22 via the conductive particle 53 in an anisotropic conductive film 52. Thus, the capacitance is constituted by the common line 28, the upper electrode 51 and the gate insulation film 54.

Moreover, when the aforementioned Gray code is used as a position information signal for x-coordinate detection, the detection accuracy can further be improved by adopting a method as described below. That is, when, for example, a 4-bit Gray code is used, the number of succession of same values in the x-detection differs depending on bits as shown in FIG. 16. That is, there is a succession of eight "1's" at the 4th bit. In contrast to this, there is a succession of four "1's" at the 3rd and 2nd bits, and there is a succession of only two "1's" at the 1st bit. Then, the H-level voltage is applied to adjacent signal wiring lines 12 by the number of succession of "1's". Consequently, the number (area) of the signal wiring lines 12 to which the H-level voltage is applied is varied according to bits.

Figure 17A:
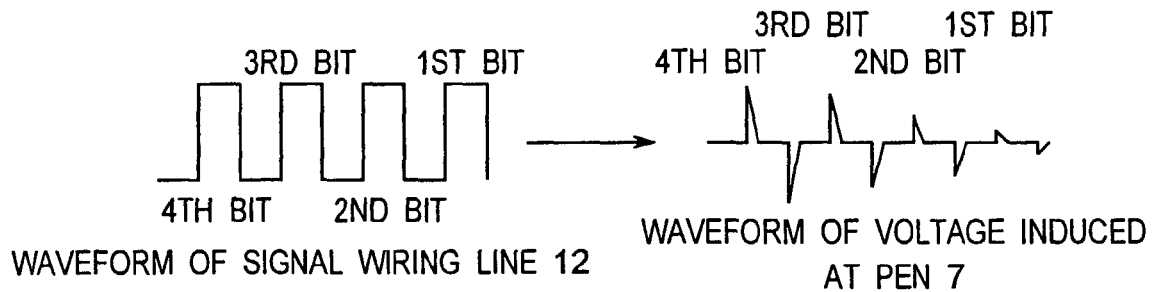
FIGS. 17A and 17B are views showing a relation between a voltage applied to the signal wiring line every bit and an induced voltage induced at a tip electrode of a pen.
Figure 17B:
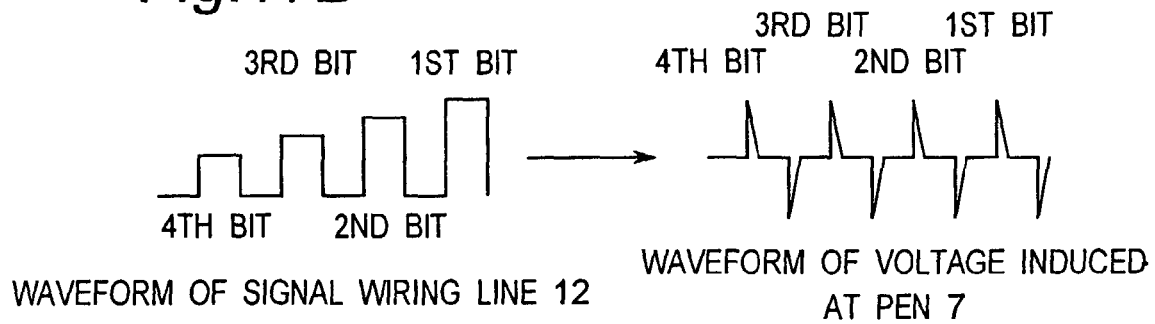

As a result, when the value of the H-level voltage applied to the signal wiring line 12 is same in each bit as shown in FIG. 17A, the induced voltage induced at the tip electrode of the pen 7 is varied according to bits. In the above case, it is very difficult to set a threshold value for determining the sampling value to be "1" or "0", and the values of low-order bits cannot be determined when the number of bits is increased. Accordingly, as shown in FIG. 17B, the value of the H-level voltage applied to the signal wiring line 12 is varied in each bit according to the number of succession of "1's" in the x-direction. That is, the H-level voltage value is lowered as the number of succession of "1's" is increased. With this arrangement, the induced voltage induced at the tip electrode of the pen 7 can be unified, allowing the setting of the threshold value for determining the sampling value to be "1" or "0" becomes very simple. As a result, the values of the low-order bits can easily be determined even if the number of bits is increased, and the detection accuracy can further be improved.

Second Embodiment

The basic construction of the input-output integrated type tablet device of the present embodiment is the same as that of the input-output integrated type tablet device of the first embodiment shown in FIG. 1. Moreover, the basic operation is also the same as that of the input-output integrated type tablet device of the first embodiment. The present input-output integrated type tablet device differs from that of the first embodiment in the construction and method relevant to the y-coordinate detection in the position detection period.

Figure 18:
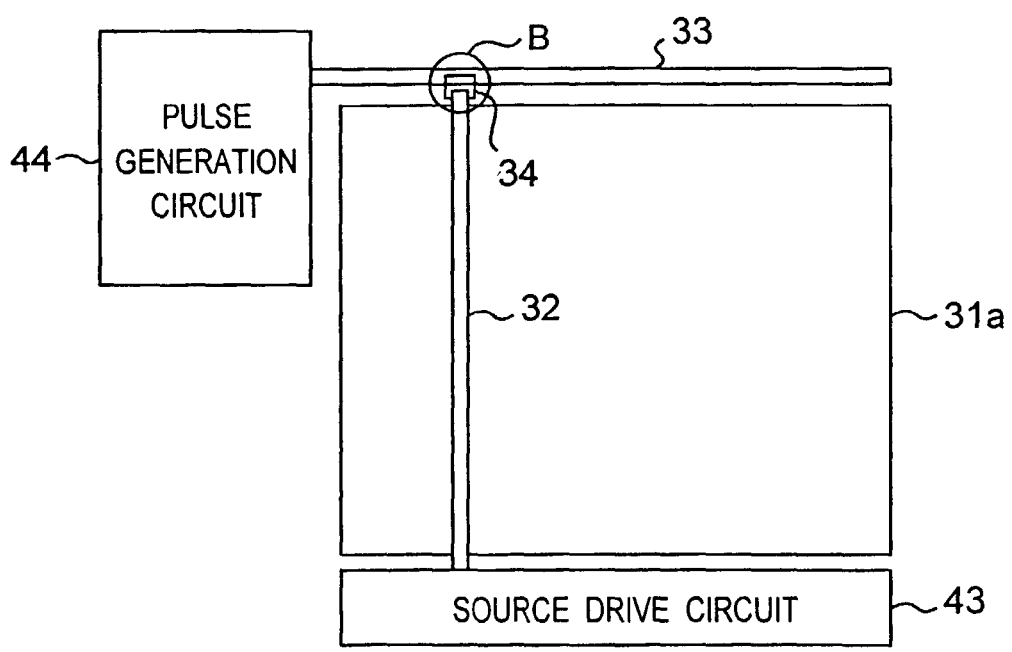
FIG. 18 is an explanatory view of an input position detection system in a display panel different from that of FIG. 5.

That is, as shown in FIG. 18, a signal wiring line 32 of the present input-output integrated type tablet device does not constitute the capacitance not by intersecting a common line 33 formed parallel to the scanning lines outside a display region 31a on the TFT substrate. One end of each signal wiring line 32 is connected to the common line 33 via a transistor 34 instead.

Figure 19:
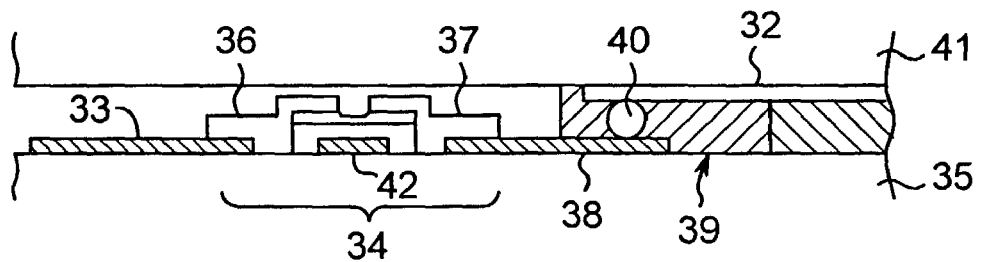
FIG. 19 is an enlarged sectional view of a region B in FIG. 18.

FIG. 19 shows the enlarged section of the one end portion B of the signal wiring line 32. As shown in FIG. 19, the drain electrode 36 of the transistor 34 formed on the TFT substrate 35 is connected to the common line 33, while its source electrode 37 is connected to the signal wiring line 32 on an opposite substrate 41 via a connection wiring line 38 and a conductive particle 40 in an anisotropic conductive film 39.

Then, a position information control signal from the position information control circuit (see FIG. 1) is inputted to the gate electrode 42 of the transistor 34. Then, the transistor 34 is turned on in the y-detection period on the basis of the position information control signal, and the signal wiring line 32 is connected to the common line 33.

Figures 20A, 20B:
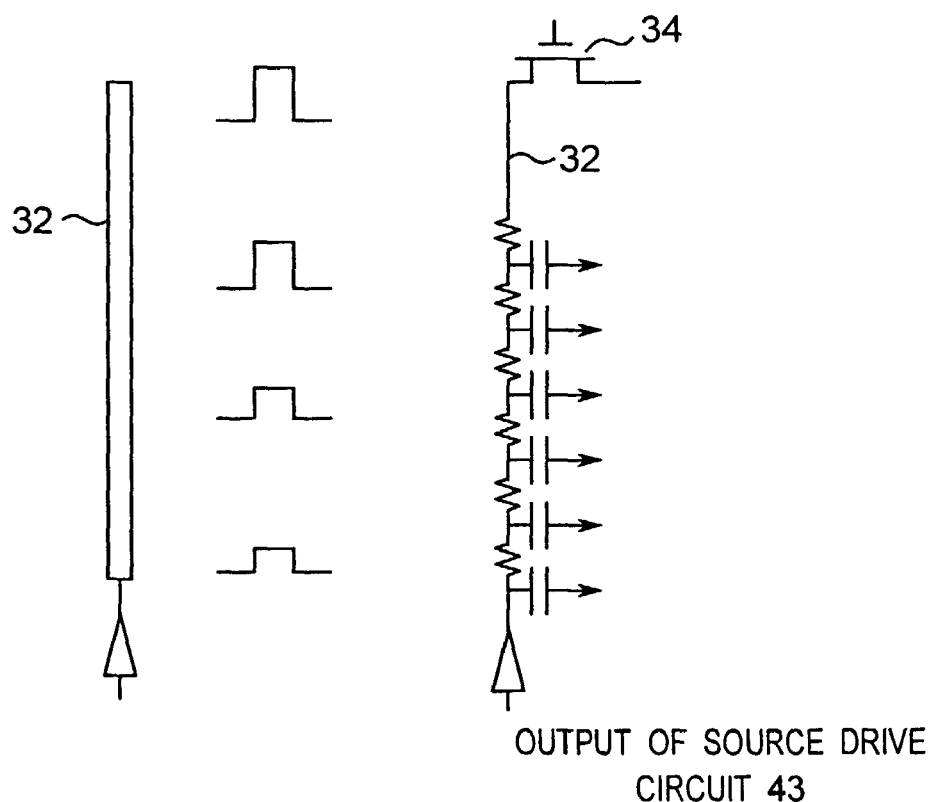
FIGS. 20A and 20B are explanatory views of the principle of y-coordinate detection by the input position detection system shown in FIG. 18 and a potential variation that occurs in the signal wiring line.

The input-output integrated type tablet device of the above-mentioned construction operates as follows to perform the detection of the y-coordinate at the pen point. That is, the side, which belongs to the signal wiring line 32 and is located opposite from the source drive circuit 43 side, is connected to the common line 33 on the basis of a position information control signal from the position information control circuit in the y-detection period as described above. Then, a voltage applied from the source drive circuit 43 to the signal wiring line 32 is made to be a constant voltage, and a rectangular wave is inputted from the pulse generation circuit 44. Then, as shown in FIG. 20, the rectangular wave voltage is attenuated by the resistance of the signal wiring line 32. Then, the voltage value reduces in proportion to a distance from the end, which belongs to the signal wiring line 32 and is located on the transistor 34 side and comes to have a minimum voltage value at the end located on the source drive circuit 43 side.

Accordingly, similarly to the case of the first embodiment, the y-coordinate at the tip of the pen is detected by detecting the voltage value of the signal wiring line 32 by the voltage value of an induced voltage generated at the tip electrode of the pen (see FIG. 1), which is capacitively coupled with the signal wiring line 32, and converting the value into a digital value by the coordinate detection circuit (see FIG. 1).

In the above-mentioned case, the voltage applied from the source drive circuit 43 to the signal wiring line 32 is made to be a constant voltage, and the rectangular wave is inputted from the pulse generation circuit 44. However, it is acceptable to make the voltage applied from the pulse generation circuit 44 be a constant voltage and input a rectangular wave from the source drive circuit 43. In the above case, it is allowed to connect the signal wiring line 32 with the reference wiring line (see FIG. 3) of the display panel and eliminate either one of the pulse generation circuit 44 and the reference wiring line drive circuit (see FIG. 1).

Third Embodiment

In each of the aforementioned embodiments, the coordinates at the tip of the pen 7 are obtained on the basis of the peak value of the voltage signal (hereinafter referred to as an induced voltage signal) induced at the tip electrode of the pen 7 due to the position information signal applied to the signal wiring lines 12 and 32. Therefore, the following problems occur in the aforementioned embodiments.

Figure 21:
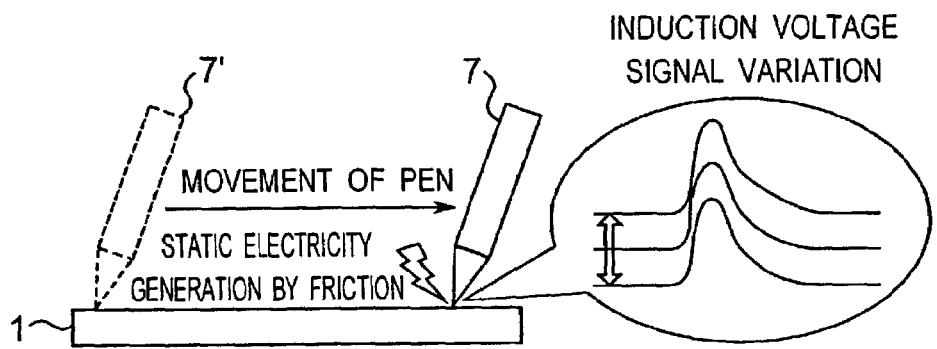
Figure 22:
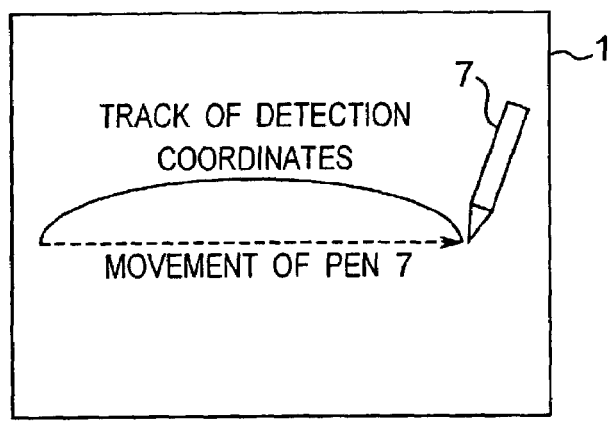
FIG. 22 is a view showing the deviation of the detection coordinates from the track of the pen point due to the voltage variation of the induced voltage signal.

That is, as shown in FIG. 21, the voltage of the induced voltage signal sometimes varies due to some factors of, for example, static electricity, noise and so on generated by friction between the tip of the pen 7 and the surface of the display panel 1 in the position detection portions of the surface of the display panel 1, the tip portion of the pen 7 and so on. In the above case, as shown in FIG. 22, the track of the tip of the pen 7 and the track of the detection coordinates differ from each other due to the voltage variation of the induced voltage signal.

The voltage variation of the induced voltage signal, as described above, is constituted mainly of the static electricity generated between the opposite substrates 22 and 41 and the tip of the pen 7. Therefore, it can be considered to adopt a combination such that no static electricity is generated, by selecting the materials and shapes of the tip of the pen 7 and the surface of the display panel 1 as measures against this phenomenon. However, the materials to be used and the shapes of the tip of the pen 7 and the surface of the display panel 1 are limited, and this impairs the degree of flexibility in development and production.

The present embodiment solves the aforementioned problems and relates to an input-output integrated type display device capable of more accurately detecting the input coordinates. The input-output integrated type display device of the present embodiment will be described below referring to FIGS. 23 through 26. It is to be noted that the basic construction of the input-output integrated type display device of the present embodiment is the same as the construction of the first embodiment shown in FIG. 1, and therefore, no detailed description is provided for the construction.

Figure 23:
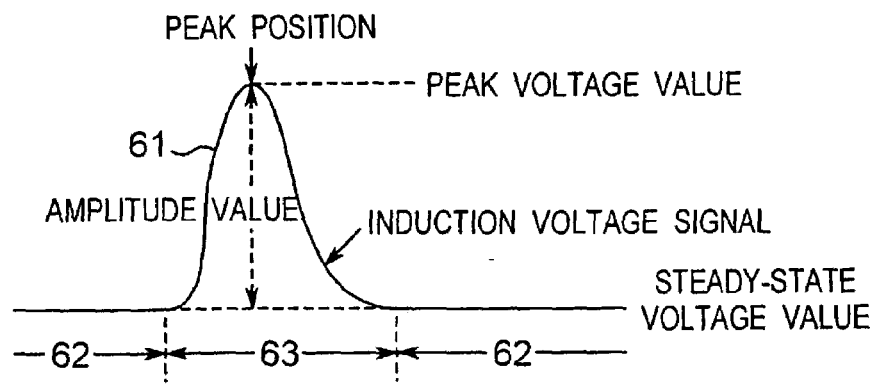
FIG. 23 is an explanatory view of portions of an induced voltage signal waveform.

First of all, the names of the portions (voltage waveform regions) of the induced voltage signal, which is induced in the position information signal applied to the signal wiring line of the opposite substrate and generated at the tip electrode of the pen in this input-output integrated type display device, are explained. In FIG. 23, the curve indicates the induced voltage signal 61. This induced voltage signal 61 includes a voltage stationary period 62, which takes a comparatively constant voltage value, and a voltage varying period 63, which is located between the voltage stationary periods 62 and during which the voltage largely varies. One voltage stationary period 62 and one voltage varying period 63 subsequent to the period constitute one detection period. Then, it is assumed that the voltage value in the voltage stationary period 62 is referred to as a steady-state voltage value, the highest voltage value in the voltage varying period 63 is referred to as a peak voltage value, a time point when the peak voltage value occurs is a peak position, and the value of a difference between the peak voltage value and the steady-state voltage value is referred to as an amplitude value.

In the first and second embodiments, the coordinates at the tip of the pen are detected by the peak value with respect to the reference voltage of the induced voltage signal. Herein is considered the case where the induced voltage signal suffers a voltage variation due to some factors like the induced voltage signals 67 through 69 shown in FIG. 25. In this case, since a certain voltage value, i.e., a voltage variation component is superimposed on the voltage value of the original induced voltage signal, it is assumed that the amplitude values of induced voltage signals 67 through 69 have no difference from the amplitude value of the original induced voltage signal.

Then, in the first and second embodiments, a detection control signal Pa, which is one of position information control signals from the position information control circuit 6 (see FIG. 1) to the coordinate detection circuit 8 (see FIG. 1), is a pulse signal for performing only once voltage detection (one detection value for one induced voltage signal) for the induced voltage signals 67 through 69 at a time point $Pa_1$ at the peak position within the detection cycle. Therefore, the reference voltage Vbase when determining the amplitude value is an identical voltage value (normally, the voltage level of the reference voltage Vbase is often set at the GND level) for all of the induced voltage signals 67 through 69. For the above reasons, the amplitude values E' through G' of the induced voltage signals 67 through 69 largely vary, and the amplitude values E' through G' disadvantageously largely vary when a voltage variation occurs.

That is, in the case of the coordinate detection method for performing once voltage detection for one induced voltage signal as described above, for example, the tip of the pen 7 is brought in contact with and moved on the surface of the display panel 1 to generate static electricity due to friction between the tip of the pen 7 and the surface of the display panel 1. If the voltage of the induced voltage signal 61 varies due to the static electricity, there disadvantageously occurs a deviation between the movement of the tip of the pen 7 and the track of the detection coordinates as shown in FIG. 22.

Figure 24:
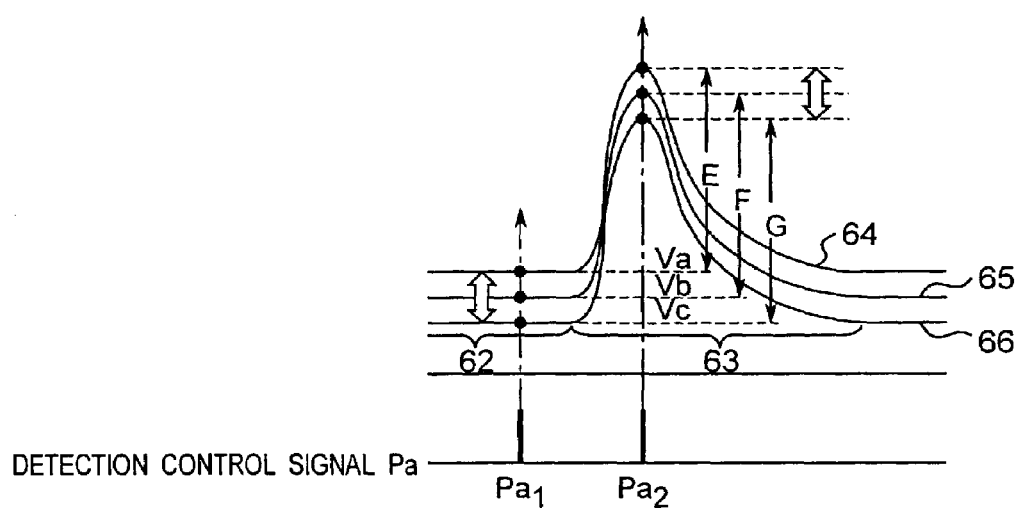
FIG. 24 is an explanatory view of a coordinate detection method capable of correctly obtaining an amplitude value even if a voltage variation occurs in the induced voltage signal.
Figure 25:
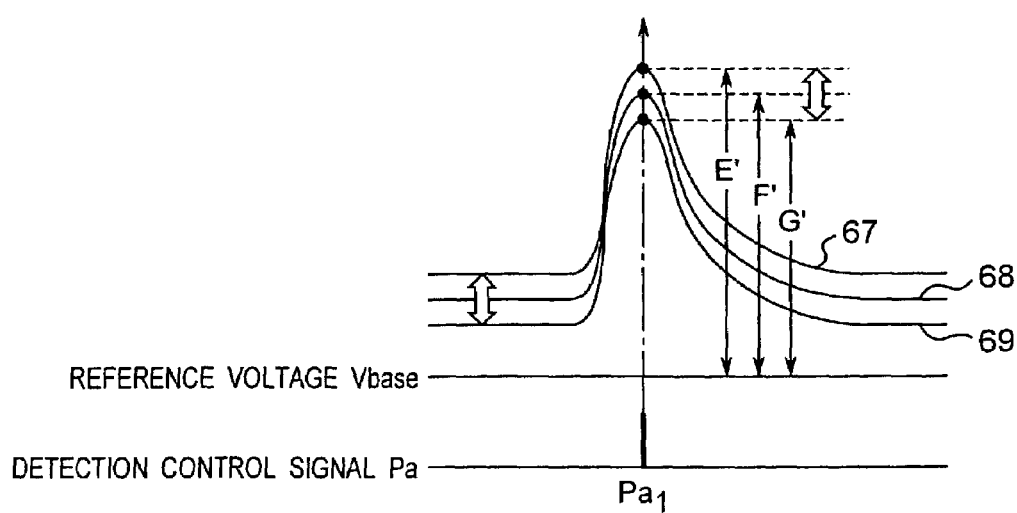
FIG. 25 is an explanatory view of an amplitude value variation when a voltage variation occurs in the induced voltage signal.

Accordingly, in the present embodiment, as shown in FIG. 24, the detection control signal Pa is set as a pulse signal for performing once voltage detection (two detection values for one induced voltage signal) for the induced voltage signals 64 through 66 at a time point $Pa_1$ in the voltage stationary period 62 and a time point $Pa_2$ in the voltage varying period 63 within the detection cycle. Then, steady-state voltage values Va, Vb and Vc are detected at the time point $Pa_1$ in the voltage stationary period 62, and the peak voltage value is detected at the time point $Pa_2$ in the voltage varying period 63. By obtaining a difference between the detected peak voltage value and the steady-state voltage values Va, Vb and Vc, the amplitude value is determined.

In the above case, the induced voltage signals 64 through 66 are constituted by superimposing the voltage value of the voltage variation component on the original induced voltage signal. Therefore, the peak voltage value and the steady-state voltage values Va, Vb and Vc of the induced voltage signals 64 through 66 are constituted by superimposing the voltage value of the voltage variation component on the original peak voltage value and the steady-state voltage value. Therefore, the amplitude values of the induced voltage signals 64 through 66 have scarce difference from the amplitude value of the original induced voltage signal. Therefore, by obtaining the amplitude values E through G with the steady-state voltage values Va, Vb and Vc corresponding to the induced voltage signals 64 through 66 served as a reference voltage, the amplitude values E through G can be accurately read as the same value under the respective voltage variations even when a voltage variation occurs.

Figure 26:
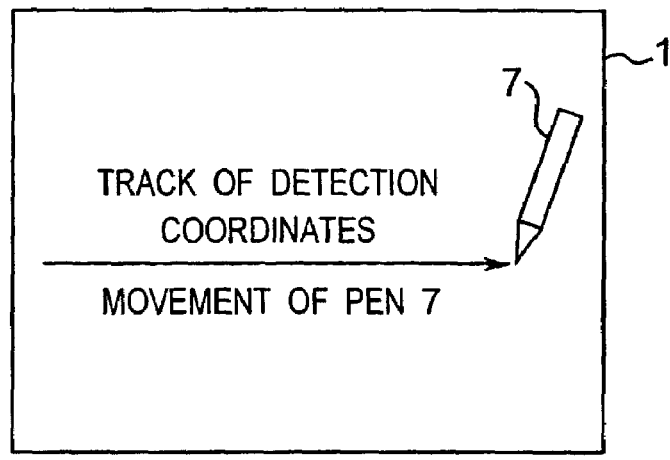
FIG. 26 is a view showing the track of the pen point and the track of the detection coordinates by the coordinate detection method shown in FIG. 24.

As a result, according to the present embodiment, even when the voltage of the induced voltage signal 61 is varied by the static electricity due to, for example, friction between the tip of the pen 7 and the surface of the display panel 1, there occurs no deviation between the movement of the tip of the pen 7 and the track of the detection coordinates as shown in FIG. 26.

In FIG. 24, the voltage stationary period 62 is set in the voltage stationary period before the voltage varying period 63. However, it is acceptable to set the voltage stationary period 62 behind the voltage varying period 63.

Fourth Embodiment

Figure 27:
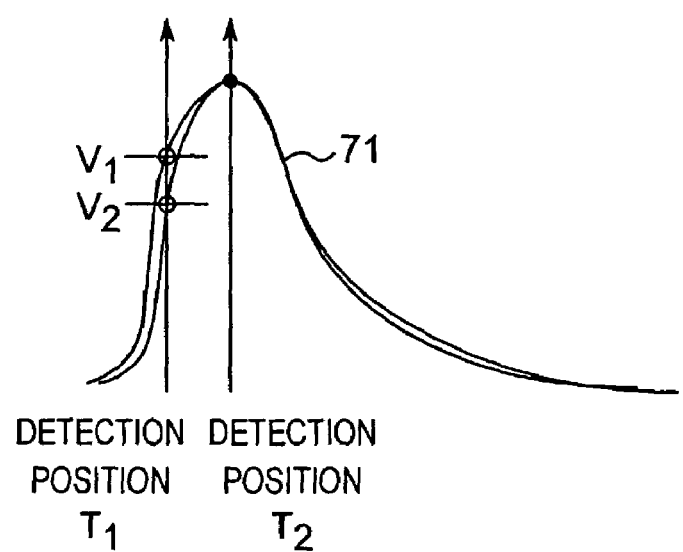
FIG. 27 is an explanatory view of a detection value variation that occurs when a distortion occurs in the induced voltage signal.

The position, in which the most stable amplitude value of the induced voltage signal is obtained, is the peak position. For example, as shown in FIG. 27, if the voltage is detected at the rise portion of the waveform at a detection position "$T_1$" when, for example, distortion occurs for some factors in an induced voltage signal 71, then the detection value disadvantageously largely varies like $V_1$ and $V_2$ with respect to the distortion of the waveform due to noise and voltage fluctuation. In contrast to this, when the voltage is detected at the peak position like the detection position "$T_2$" the detection value does not largely vary with respect to the waveform distortion. That is, a detection method capable of detecting the peak voltage value consistently with stability and tolerating the waveform distortion can be provided.

Figure 28:
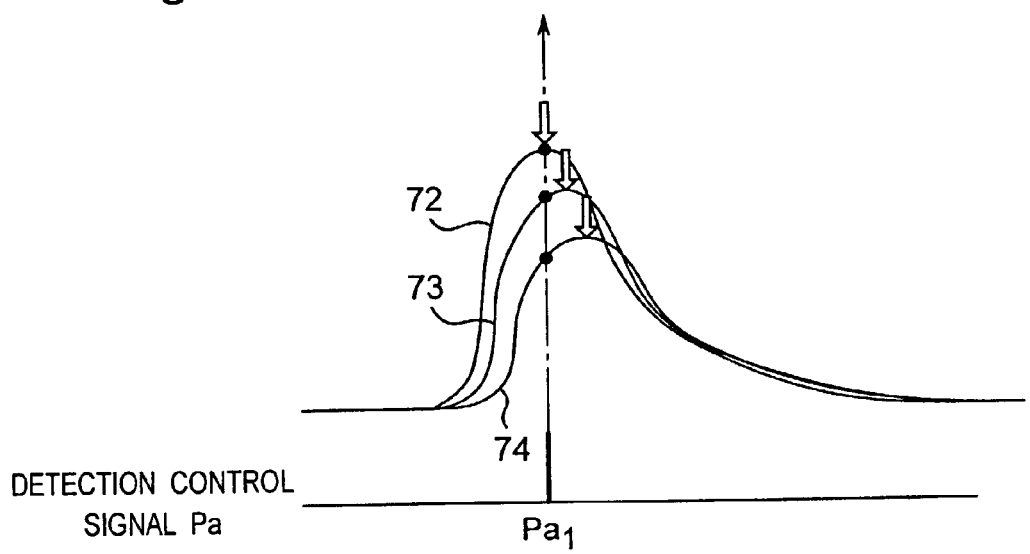
FIG. 28 is an explanatory view of a peak position shift that occurs in accordance with the variation in amplitude of the induced voltage signal.
Figure 29:
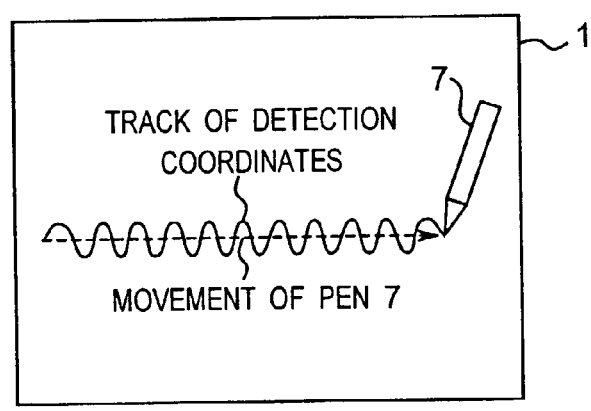
FIG. 29 is a view showing a deviation of the track of the detection coordinates from the track of the pen point due to the peak position shift of the induced voltage signal.

However, through various examinations, it was discovered that the peak position of the induced voltage signal varied in accordance with the amplitude value of the signal. That is, as shown by example in FIG. 28, in accordance with the amplitude variation of the induced voltage signals 72 through 74, the peak position shifts as indicated by the arrows. When the peak position shifts as described above, the peak voltage value cannot be detected consistently with stability by the detection control signal Pa that performs once voltage detection within the detection cycle. That is, in the case of the detection method as described above, when, for example, the distortion of the induced voltage signal occurs for some reasons, the detection value disadvantageously largely varies, and deviation occurs between the track of the tip of the pen 7 and the detection coordinates as shown in FIG. 29.

Figure 30:
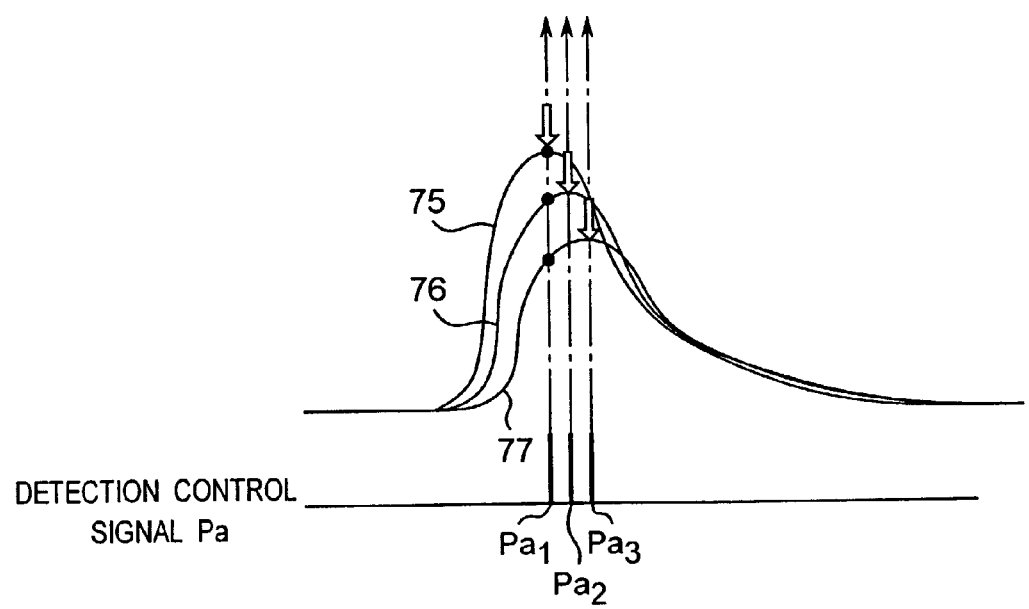
FIG. 30 is an explanatory view of a coordinate detection method capable of correctly obtaining the amplitude value even if a peak position shift occurs in the induced voltage signal.

Accordingly, in the present embodiment, as shown in FIG. 30, the detection control signal Pa is set as a pulse signal for performing voltage detection (a plurality of detection values for one induced voltage signal) a plurality of times (three times at the time points of $Pa_1$ through $Pa_3$ in FIG. 30) in the vicinity of the peak position in the voltage varying period of one induced voltage signal (induced voltage signal 76, for example) within the detection cycle. Then, the maximum value of the plurality of detection values is recognized as a peak voltage value by performing the voltage detection a plurality of times in the vicinity of the peak position of one induced voltage signal 76.

By the above-mentioned operation, the voltage detection is performed a plurality of times in the vicinity of the peak position even when the peak position is shifted in accordance with the amplitude variation of the induced voltage signal. Therefore, the peak voltage value can be detected consistently with stability. Therefore, as shown in FIG. 26, no deviation occurs between the movement of the tip of the pen 7 and the track of the detection coordinates. In the above case, by increasing the voltage detection frequency to elevate the detection cycle, the peak voltage value can be detected more accurately.

In the present embodiment, the maximum value of the plurality of detection values is recognized as the peak voltage value as described above. However, when the peak position shifts less or when the peak is broad or in a similar case, it is possible to recognize the mean value of the detection values as the peak voltage value instead of the maximum value.

Fifth Embodiment

Figure 31:
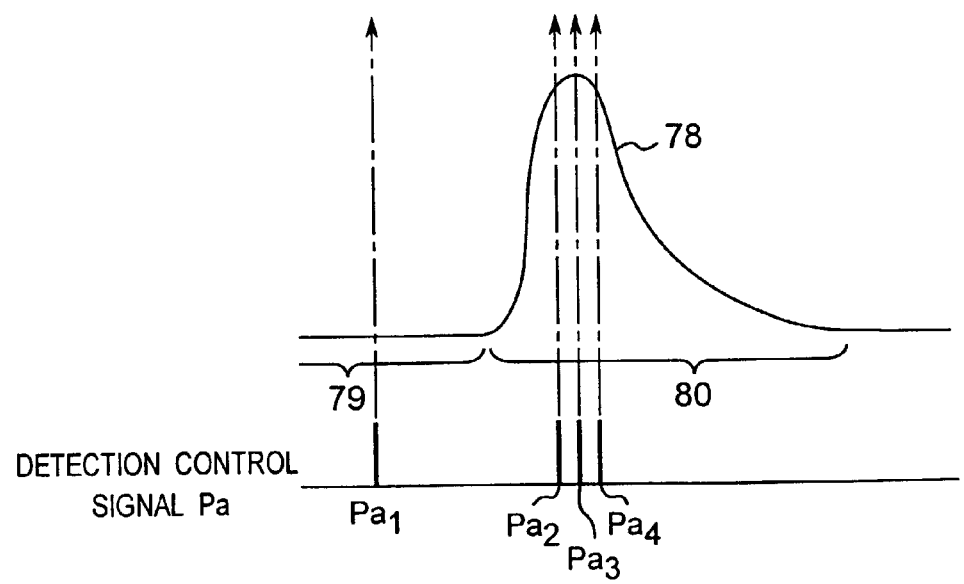
FIG. 31 is an explanatory view of a coordinate detection method different from those of FIGS. 24 and 30.

The present embodiment is a combination of the third embodiment and the fourth embodiment. That is, in the present embodiment, as shown in FIG. 31, the detection control signal Pa is set as a pulse signal for performing voltage detection (a plurality of detection values for one induced voltage signal) a plurality of times (three times) for an induced voltage signal 78 at the time points of $Pa_1$ in a voltage stationary period 79 within the detection cycle and time points $Pa_2$ through $Pa_4$ in the vicinity of the peak position in a voltage varying period 80. Then, by detecting the steady-state voltage value at the time point $Pa_1$ in the voltage stationary period 79, detecting the peak voltage value a plurality of times at the time points $Pa_2$ through $Pa_4$ in the voltage varying period 80 and obtaining a difference between the maximum value (corresponding to the first detection value) of the detected peak voltage value and the steady-state voltage value, the amplitude value is determined.

Therefore, according to the present embodiment, even when the voltage of the induced voltage signal 78 is varied by, for example, static electricity due to friction between the tip of the pen 7 and the surface of the display panel 1, the amplitude value of the induced voltage signal 78 can be detected consistently with stability. Furthermore, even when the peak position is shifted in accordance with the amplitude variation of the induced voltage signal 78, the peak voltage value can be detected consistently with stability. Therefore, as shown in FIG. 26, no deviation occurs between the movement of the tip of the pen 7 and the track of the detection coordinates.

In the above case, by increasing the voltage detection frequency to elevate the detection cycle, the peak voltage value can be detected more accurately. Moreover, it is acceptable to set the voltage stationary period 79 behind the voltage varying period 80.

Sixth Embodiment

Figure 32:
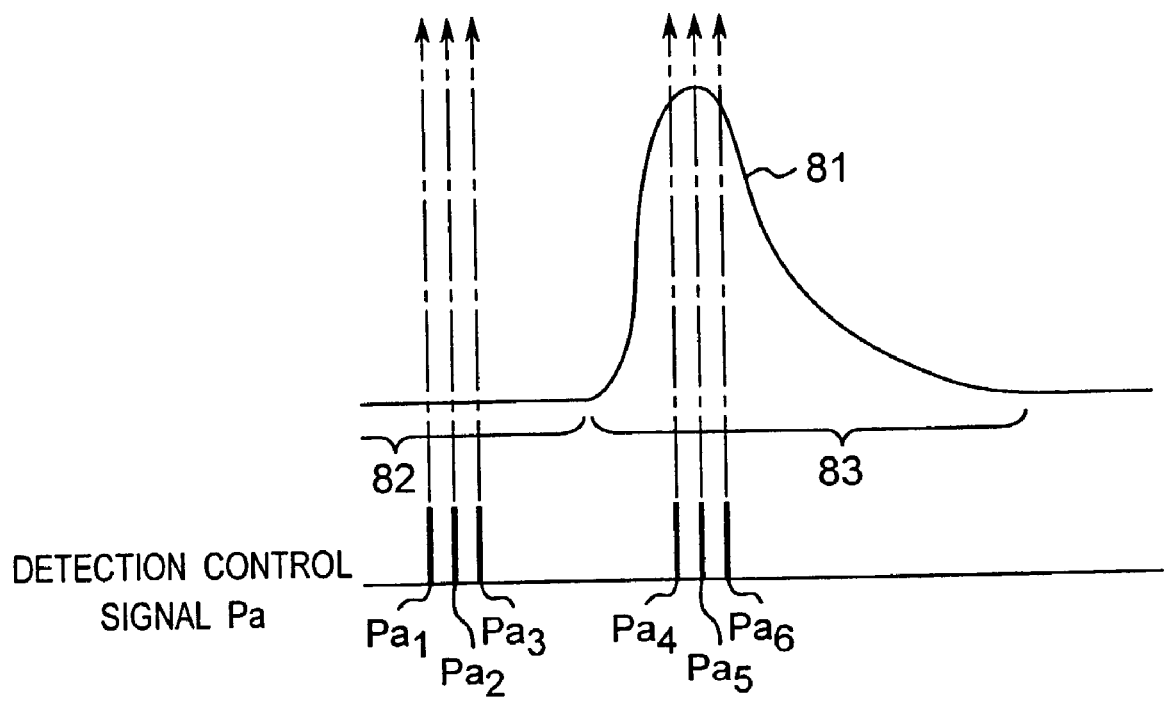
FIG. 32 is an explanatory view of a coordinate detection method different from those of FIGS. 24, 30 and 31.

In the present embodiment, the voltage detection frequency in the voltage stationary period 79 within the detection cycle of the fifth embodiment is set at a plurality of times equal to the voltage detection frequency in the vicinity of the peak position in the voltage varying period 80. That is, in the present embodiment, as shown in FIG. 32, the detection control signal Pa is set as a pulse signal for performing voltage detection (a plurality of detection values for one induced voltage signal) a plurality of times (three times) for an induced voltage signal 81 at the time points $Pa_1$ through $Pa_3$ in the voltage stationary period 82 within the detection cycle and a plurality of times (three times) at the time points $Pa_4$ through $Pa_6$ in the vicinity of the peak position. Then, by detecting the steady-state voltage value a plurality of times at the time points $Pa_1$ through $Pa_3$ in the voltage stationary period 82, detecting the peak voltage value a plurality of times at the time points $Pa_4$ through $Pa_6$ in the voltage varying period 80 and obtaining a difference between the maximum value (corresponding to the first detection value) of the detected peak voltage value and the steady-state voltage value, the amplitude value is determined. In the above case, the amplitude value can be determined most accurately by using the mean value (corresponding to the second detection value) of the steady-state voltage value detected a plurality of times.

According to the present embodiment, the amplitude value of the induced voltage signal 81 can be detected consistently with stability even when the voltage of the induced voltage signal 81 is varied by, for example, static electricity due to friction between the tip portion of the pen 7 and the surface of the display panel 1. Furthermore, even when the peak position is shifted in accordance with the amplitude variation of the induced voltage signal 81, the peak voltage value can be detected consistently with stability. Therefore, as shown in FIG. 26, no deviation occurs between the movement of the tip of the pen 7 and the track of the detection coordinates.

In the above case, by increasing the voltage detection frequency to elevate the detection cycle, the peak voltage value can be detected more accurately. Moreover, it is acceptable to set the voltage stationary period 82 behind the voltage varying period 83.

In each of the aforementioned embodiments, the tip of the pen 7 is provided with the tip electrode capacitively coupled with the signal wiring lines 12 and 32, and the induced voltages corresponding to the voltages of the signal wiring lines 12 and 32 are obtained. However, the method for detecting the voltages of the signal wiring lines 12 and 32 is not limited to this, and it is acceptable to detect the voltages as a current variation with a pen that has an inductively coupled tip electrode.

Moreover, in each of the aforementioned embodiments, the position detection period is time-sharingly divided into the x-detection period and the y-detection period, the position information signal for the x-coordinate detection is applied in the x-detection period, and the position information signal for the y-coordinate detection is applied in the y-detection period. However, the present invention is not limited to this, and it is acceptable to simultaneously detect the x-coordinate and the y-coordinate by applying only once the position information signal that has the x-coordinate information and the y-coordinate information. For example, it is allowed to use a digital value of a plurality of bits as the x-coordinate information and use an attenuated peak value of the pulse signal that represents the digital value as the y-coordinate information.

Moreover, in each of the aforementioned embodiments, the present invention is applied to the input-output integrated type display device of the so-called opposing source structure such that the reference wiring line 13, the scanning line 14, the pixel electrode 15 and the TFT 17 are formed on the TFT substrates 21 and 35 while the signal wiring lines 12 and 32 are formed on the opposite substrates 22 and 41. However, the present invention is not limited to this. If it is intended to detect the input position with the pen in a very short time within the non-display period of one frame scanning neither the row lines nor the column lines of the display panel in, for example, the position detection period, then the present invention can also be applied to a display integrated type tablet device in which the scanning lines, the signal lines, the pixel electrodes and the TFT's are formed on the TFT substrate while the opposite electrodes are formed on the opposite substrate as disclosed in the aforementioned Japanese Patent Laid-Open Publication No. HEI 6-314165. Furthermore, the present invention can also be applied to a display integrated type tablet device of the so-called duty ratio type such that a plurality of segment electrodes formed parallel on the glass substrate and a plurality of common electrodes formed parallel on the glass substrate are made to intersect each other with liquid crystals held between both the electrodes, and an image is displayed on pixels constructed of the intersection regions of both the electrodes in accordance with the voltage across both the electrodes.

As is apparent from the above, the input-output integrated type display device of the first aspect of this invention simultaneously applies the position information signal to the plurality of column lines on the display panel in the non-display period by the position information control means, detects the position information signal applied to the column line located in the vicinity of the tip portion by the signal detection section and detects the input position on the display panel on the basis of the detected position information signal by the signal detection section. Therefore, there is no need for scanning the row lines and the column lines of the display panel, and this allows the input position to be detected in a very short time within the non-display period of one frame. Therefore, the input position can be detected a plurality of times in one frame, and this allows the input position to be detected more accurately.

Moreover, the input-output integrated type display device of one embodiment time-sequentially applies the first position information signal that represents the position in the direction of row on the display panel and the second position information signal that represents the position in the direction of column by the position information control means and detects the positions in the directions of row and column on the display panel by the position detection means on the basis of the respective position information signals. Therefore, the positions on the display panel can reliably be detected.

Moreover, the input-output integrated type display device of the second aspect of this invention simultaneously inputs the position information signal to all the signal wiring lines by the position information control means in the non-display period, detects the position information signal inputted to the signal wiring line located in the vicinity of the tip portion by the position information signal detection means and detects the tip position of the position information signal detection means on the liquid crystal display panel by the position detection means on the basis of this detected position information signal. Therefore, the position detection can be performed in a very short time within the non-display period of one frame scanning neither the scanning lines nor the signal lines of the liquid crystal display panel.

Furthermore, if the signal wiring lines are formed of the ITO film or the like on the second insulating substrate, then the reflection of light such as extraneous light incident from the front side on the signal wiring lines can be made very little when the first insulating substrate is located on the front side (upper side), and a reduction in display quality due to a reduction in contrast in the portions where extraneous light exists can be restrained.

Furthermore, it is only required to add the position information control means for simultaneously inputting the position information signal to the plurality of signal wiring lines to the display control means for displaying an image on the liquid crystal display panel, and this allows the peripheral circuit to be modified less. Therefore, the cost increase due to the addition of the input position detection function can also be suppressed to the minimum.

Moreover, in the input-output integrated type display device of one embodiment, the first position information signal that represents the position in the direction of row on the liquid crystal display panel out of the position information signals is made to have an amplitude corresponding to the position in the direction of row. Therefore, the position detection means can obtain the position in the direction of row on the liquid crystal display panel through the simple process of merely multiplying the value of amplitude based on the first position information signal detected by the position information signal detection means by the coefficient. Therefore, the detection time of the input position can further be shortened.

Moreover, in the input-output integrated type display device of one embodiment, the first position information signal is a digital signal that represents the position in the direction of row by a combination of the voltage level that exceeds the reference voltage level and the voltage level that does not exceed the reference voltage level. Therefore, the position detection means can obtain a position in the direction of row on the liquid crystal display panel by obtaining the digital value expressed by the first position information signal detected by the position information signal detection means.

Moreover, in the input-output integrated type display device of one embodiment, the digital signal is expressed by the Gray code. Therefore, even if the digital signal inputted to the signal wiring line located in the vicinity of the tip portion is erroneously detected by the position information signal detection means, the deviation between the actual position of the signal wiring line and the detection position occurs only between the mutually adjacent signal wiring lines. Therefore, the position in the direction of column can be accurately detected.

Furthermore, the input-output integrated type display device of one embodiment is provided with a common line, which extends in the direction of row on the first insulating substrate and is capacitively coupled with one end portion of each of the plurality of signal wiring lines on the second insulating substrate, and the voltage signal, which is generated in each signal wiring line due to the pulse applied to the common line and has an amplitude that attenuates in accordance with the distance from the common line, is made to be the second position information signal that represents the position in the direction of column on the liquid crystal display panel. Therefore, the position detection means can obtain the position in the direction of row on the liquid crystal display panel through the simple process of multiplying the value of amplitude based on the position information signal detected by the position information signal detection means by the coefficient.

Furthermore, since the signal wiring lines are formed in a stripe shape, no spreading resistance occurs. Therefore, the position in the direction of column on the liquid crystal display panel can be accurately obtained.

Moreover, in the input-output integrated type display device of one embodiment, the common line is electrically connected to the reference wiring line. Therefore, the means for retaining the reference wiring line at a voltage of a prescribed level in the display period and the means for applying the pulse to the common line in the non-display period can synergetically serve. Therefore, the construction of the position information control means can be simplified.

Moreover, in the input-output integrated type display device of one embodiment, the position information control means applies a halftone display voltage to the other end of the plurality of signal wiring lines when the pulse is applied to the common line during the position detection in the direction of column. Therefore, even in the case of the so-called 1H line inversion drive, the reference voltage of the signal wiring line can be maintained at a constant voltage. Therefore, noise due to signals other than the signal of position information (aforementioned potential variation) can be prevented from being superimposed on the second position information signal.

Moreover, in the input-output integrated type display device of one embodiment, the position information control means intermittently connects and disconnects the switching means provided between the power source and the common line to generate the pulse to be applied to the common line. Therefore, a pulse having a steep leading edge can be applied. Therefore, the potential variation, which is caused on each signal wiring line due to the pulse, can be increased, and the position in the direction of column can be accurately detected.

Moreover, the input-output integrated type display device of one embodiment is provided with the common line, which is extended in the direction of row on the first insulating substrate and connected via switching means to each of one end portions of the plurality of signal wiring lines on the second insulating substrate. The switching means is turned on to make the pulse signal, which is generated in each signal wiring line due to the pulse applied to the common line and has an amplitude that attenuates in accordance with the distance from the common line, serve as the second position information signal that represents the position in the direction of column on the liquid crystal display panel. Therefore, the position detection means can obtain the position in the direction of column on the liquid crystal display panel through the simple process of merely multiplying the value of amplitude based on the position information signal detected by the position information signal detection means by the coefficient.

Furthermore, since the signal wiring lines are formed in a stripe shape, no spreading resistance occurs. Therefore, the position in the direction of column on the liquid crystal display panel can be accurately obtained.

Moreover, the input-output integrated type display device of one embodiment is provided with the common line which is extended in the direction of row on the first insulating substrate and connected via the switching means to each of one end portions of the plurality of signal wiring lines on the second insulating substrate. The switching means is turned on to make the pulse signal, which is applied to the other end of the plurality of signal wiring lines and attenuates in accordance with the distance from the other end, serve as the second position information signal. Therefore, the position detection means can obtain the position in the direction of column on the liquid crystal display panel through the simple process of merely multiplying the value of amplitude based on the position information signal detected by the position information signal detection means by the coefficient.

Furthermore, since the signal wiring lines are formed in a stripe shape, no spreading resistance occurs. Therefore, the position in the direction of column on the liquid crystal display panel can be accurately obtained.

Moreover, in the input-output integrated type display device of one embodiment, the position information signal detection means is provided with a conductor to be coupled with the signal wiring line located in the vicinity of the tip portion. Therefore, the voltage information, which is owned by the first position information signal and the second position information signal and corresponds to the position on the liquid crystal display panel, can be detected as a voltage variation by the position information signal detection means.

Moreover, in the input-output integrated type display device of one embodiment, the position information signal detection means is provided with a conductor to be inductively coupled with the signal wiring line located in the vicinity of the tip portion. Therefore, the voltage information, which is owned by the first position information signal and the second position information signal and corresponds to the position on the liquid crystal display panel, can be detected as a current variation by the position information signal detection means.

Moreover, the input-output integrated type display device of one embodiment of the invention stops supplying the power source to the position detection means except for the period during which the tip position of the position information signal detection means is detected. Therefore, power consumption can be reduced.

Moreover, the input-output integrated type display device of one embodiment performs the position detection by the position detection means by detecting the values of a plurality of portions from the detected one position information signal and using the detection value. Therefore, the amplitude value, which is the difference between the value at the peak position of the detected position information signal and the value in the stationary period, can be obtained as position information. Therefore, even if the voltage of the entire position information signal detected is varied by static electricity or the like, the input position by the signal detection section or the tip position of the position information signal detection means can be accurately detected.

Moreover, in the input-output integrated type display device of one embodiment, the detection of the value by the position detection means is performed once in the stationary period during which the detected value of the position information signal is stable and performed once in the varying period during which the value largely varies. Therefore, by performing the detection of the value at the peak position in the varying period, the amplitude value, which is the difference between the peak value and the steady-state value, can be obtained as position information. Therefore, even if the voltage of the entire position information signal detected is varied by static electricity or the like, the input position by the signal detection section or the tip position of the position information signal detection means can be accurately detected.

Moreover, the input-output integrated type display device of one embodiment performs the detection of the value by the position detection means a plurality of times in the varying period. Therefore, by performing the detection of the value in the vicinity of the peak position in the varying period, even when the peak position is shifted in accordance with the amplitude variation of the detected position information signal, the peak value can be detected consistently with stability, and the input position by the signal detection section or the tip position of the position information signal detection means can be accurately detected with stability.

Moreover, the input-output integrated type display device of one embodiment performs the detection of the value by the position detection means also once in the stationary period in addition to a plurality of times in the varying period. Therefore, the amplitude value, which is the difference between the peak value and the steady-state value, can be obtained as position information. Therefore, even if the voltage of the entire detected position information signal varies, the input position by the signal detection section or the tip position of the position information signal detection means can be accurately detected. In the above case, by detecting the value a plurality of times in the vicinity of the peak position in the varying period, the peak value can be detected consistently with stability even if the peak position shifts. Therefore, the input position by the signal detection section or the tip position of the position information signal detection means can be accurately detected with stability.

Moreover, the input-output integrated type display device of one embodiment performs the detection of the value by the position detection means a plurality of times in the stationary period in addition to a plurality of times in the varying period. Therefore, even if the voltage of the entire position information signal detected is varied by static electricity or the like or if the peak position is shifted in accordance with the amplitude variation of the detected position information signal, the peak value and the steady-state value can be detected consistently with stability. Therefore, the input position by the signal detection section or the tip position of the position information signal detection means can be accurately detected.

Moreover, in the input-output integrated type display device of one embodiment, the position detection means uses the value obtained by subtracting the second detection value based on the value detected in the stationary period from the first detection value based on the value detected in the varying period as position information. Therefore, by performing the detection of the value in the vicinity of the peak position in the varying period, the amplitude value, which is the difference between the peak value and the steady-state value, can be obtained as position information. Therefore, the position information, which is tolerant to the peak position shift in accordance with the voltage variation and the amplitude variation due to static electricity or the like and is optimum for the position detection can be obtained. In this case, if there is, for example, one detected value, then the first detection value is the detected value. If there is a plurality of detected values, then the first detection value is the maximum value. Furthermore, if the detected value is, for example, one, then the second detection value is the detected value. If there is a plurality of detected values, then the second detection value is the mean value.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An input-output integrated type display device comprising:
    a liquid crystal display panel having pixel electrodes arranged in a matrix form, switching elements that are arranged in a matrix form and connected to the pixel electrodes, a plurality of scanning lines commonly connected to a control terminal of each of the switching elements arranged in the direction of row, a first insulating substrate on which a plurality of reference wiring lines commonly connected to the pixel electrodes arranged in the direction of row via the switching elements are formed, a second insulating substrate on which a plurality of stripe-shaped signal wiring lines commonly opposite to the pixel electrodes arranged in the direction of column are formed, and a liquid crystal layer held between the first insulating substrate and the second insulating substrate;
    a display control means for turning on the switching elements in rows with a scanning signal inputted to the plurality of scanning lines in a display period so as to connect the pixel electrodes to the reference wiring lines and inputting a voltage to the plurality of signal wiring lines according to display data so as to apply a display voltage corresponding to the display data across the pixel electrodes connected to the reference wiring lines and the signal wiring lines;
    a position information control means for simultaneously inputting the position information signal that represents a position on the liquid crystal display panel to the plurality of signal wiring lines in a non-display period;
    a position information signal detection means for detecting the position information signal inputted to the signal wiring line located in the vicinity of its tip portion; and
    a position detection means for detecting a tip position of the position information signal detection means on the liquid crystal display panel on the basis of the position information signal detected by the position information signal detection means.

2. The input-output integrated type display device as claimed in claim 1, wherein
    the position information signal is comprised of a first position information signal that represents a position in the direction of row and a second position information signal that represents a position in the direction of column on the liquid crystal display panel, and
    the first position information signal is a signal that has an amplitude corresponding to the position in the direction of row.

3. The input-output integrated type display device as claimed in claim 2, wherein the amplitude of the first position information signal is set so as to gradually increase or decrease from an input side of the scanning signal.

4. The input-output integrated type display device as claimed in claim 1, comprising:
    a common line, which is formed while being extended in the direction of row on the first insulating substrate and is capacitively coupled with one end portion of each of the plurality of signal wiring lines formed on the second insulating substrate, wherein
    the position information signal is comprised of a first position information signal that represents a position in the direction of row and a second position information signal that represents a position in the direction of column on the liquid crystal display panel, and
    the second position information signal is a voltage signal, which is generated in each signal wiring line due to a pulse applied to the common line and has an amplitude that attenuates gradually from the common line side.

5. The input-output integrated type display device as claimed in claim 4, wherein the common line is electrically connected to the reference wiring lines.

6. The input-output integrated type display device as claimed in claim 4, wherein the position information control means applies a halftone display voltage to the other end of the plurality of signal wiring lines when applying a pulse to the common line.

7. The input-output integrated type display device as claimed in claim 4, wherein the position information control means generates the pulse to be applied to the common line by intermittently connecting and disconnecting the switching means provided between a power source and the common line.

8. The input-output integrated type display device as claimed in claim 4, wherein inputting of the first position information signal and detection of the position in the direction of row on the liquid crystal display panel, as well as inputting of the second position information signal and detection of the position in the direction of column on the liquid crystal display panel are time-sequentially performed.

9. The input-output integrated type display device as claimed in claim 1, comprising:
    a common line, which is formed while being extended in the direction of row on the first insulating substrate and is connected to one end portion of each of the plurality of signal wiring lines formed on the second insulating substrate via the switching means, wherein
    the position information signal is comprised of a first position information signal that represents a position in the direction of row and a second position information signal that represents a position in the direction of column on the liquid crystal display panel, and
    the second position information signal is a pulse signal, which is generated in each signal wiring line due to a pulse applied to the common line after the switching means is turned on by the position information control means and has an amplitude that attenuates gradually from the common line side.

10. The input-output integrated type display device as claimed in claim 9, wherein inputting of the first position information signal and detection of the position in the direction of row on the liquid crystal display panel, as well as inputting of the second position information signal and detection of the position in the direction of column on the liquid crystal display panel are time-sequentially performed.

11. The input-output integrated type display device as claimed in claim 1, comprising:
a common line, which is formed while being extended in the direction of row on the first insulating substrate and is connected to one end portion of each of the plurality of signal wiring lines formed on the second insulating substrate via the switching means, wherein
the position information signal is comprised of a first position information signal that represents a position in the direction of row and a second position information signal that represents a position in the direction of column on the liquid crystal display panel, and
the second position information signal is a pulse signal, which is applied to the other end of the plurality of signal wiring lines after the switching means is turned on by the position information control means and has an amplitude that attenuates gradually from the other end side.

12. The input-output integrated type display device as claimed in claim 1, wherein the position information signal detection means is provided with a conductor to be capacitively coupled with the signal wiring line located in the vicinity of its tip portion.

13. The input-output integrated type display device as claimed in claim 1, wherein the position information signal detection means is provided with a conductor to be inductively coupled with the signal wiring line located in the vicinity of its tip portion.

14. The input-output integrated type display device as claimed in claim 2, wherein inputting of the first position information signal and detection of the position in the direction of row on the liquid crystal display panel, as well as inputting of the second position information signal and detection of the position in the direction of column on the liquid crystal display panel are time-sequentially performed.

15. The input-output integrated type display device as claimed in claim 1, wherein supply of power to the position detection means is stopped except for the period during which the tip position of the position information signal detection means is detected.

16. The input-output integrated type display device as claimed in claim 1, wherein the position detection by the position detection means is performed by detecting values of a plurality of portions of the detected one position information signal and using the detection values.

17. The input-output integrated type display device as claimed in claim 16, wherein the detected position information signal has a varying period during which the value largely varies and a stationary period which is located on both sides of the varying period and during which the value is stable, and
the detection of the value by the position detection means is performed once in the stationary period and once in the varying period.

18. The input-output integrated type display device as claimed in claim 16, wherein the detected position information signal has a varying period during which the value largely varies and a stationary period which is located on both sides of the varying period and during which the value is stable, and
the detection of the value by the position detection means is performed a plurality of times in the varying period.

19. The input-output integrated type display device as claimed in claim 18, wherein the detection of the value by the position detection means is additionally performed once in the stationary period.

20. The input-output integrated type display device as claimed in claim 18, wherein the detection of the value by the position detection means is additionally performed a plurality of times in the stationary period.

21. An input-output integrated type display device comprising:
a liquid crystal display panel having pixel electrodes arranged in a matrix form, switching elements that are arranged in a matrix form and connected to the pixel electrodes, a plurality of scanning lines commonly connected to a control terminal of each of the switching elements arranged in the direction of row, a first insulating substrate on which a plurality of reference wiring lines commonly connected to the pixel electrodes arranged in the direction of row via the switching elements are formed, a second insulating substrate on which a plurality of stripe-shaped signal wiring lines commonly opposite to the pixel electrodes arranged in the direction of column are formed, and a liquid crystal layer held between the first insulating substrate and the second insulating substrate;
a display control means for turning on the switching elements in rows with a scanning signal inputted to the plurality of scanning lines in a display period so as to connect the pixel electrodes to the reference wiring lines and inputting a voltage to the plurality of signal wiring lines according to display data so as to apply a display voltage corresponding to the display data across the pixel electrodes connected to the reference wiring lines and the signal wiring lines;
a position information control means for simultaneously inputting the position information signal that represents a position on the liquid crystal display panel to the plurality of signal wiring lines in a non-display period;
a position information signal detection means for detecting the position information signal inputted to the signal wiring line located in the vicinity of its tip portion;
a position detection means for detecting a tip position of the position information signal detection means on the liquid crystal display panel on the basis of the position information signal detected by the position information signal detection means;
wherein the position information signal is comprised of a first position information signal that represents a position in the direction of row and a second position information signal that represents a position in the direction of column on the liquid crystal display panel, and
wherein the first position information signal is a digital signal that represents the position in the direction of row by a combination of a voltage level that exceeds a reference voltage level and a voltage level that does not exceed the reference voltage level.

22. The input-output integrated type display device as claimed in claim 21, wherein the digital signal is expressed by a Gray code.

23. The input-output integrated type display device as claimed in claim 21, wherein inputting of the first position information signal and detection of the position in the direction of row on the liquid crystal display panel, as well as inputting of the second position information signal and detection of the position in the direction of column on the liquid crystal display panel are time-sequentially performed.

24. An input-output integrated type liquid crystal display device comprising:
- a thin film transistor (TFT) substrate including an array of TFTs, wherein the TFTs are electrically connected to scanning lines, reference lines, and pixel electrodes of the liquid crystal display;
- an opposite substrate including a plurality of signal lines that are perpendicular to the scanning lines,
- a liquid crystal layer provided between the TFT substrate and the opposite substrate, and wherein pixels are provided where the pixel electrodes of the TFT substrate cross the signal lines of the opposite substrate;
- a source drive circuit for applying source signals to the signal lines during a display period, and wherein the signal lines overlap a common line on the opposite substrate so as to form respective capacitances therebetween;
- a pulse generation circuit for applying pulses to the common line during a position detection period; and
- wherein potential variations on the common line during the detection period are transferred partially to the signal lines across said respective capacitances so as to cause spike-like potentials on the signal lines that are used in detecting a position of a stylus on the liquid crystal display device.

* * * * *